United States Patent
Yoshiie et al.

(10) Patent No.: US 6,889,809 B2
(45) Date of Patent: May 10, 2005

(54) ONE-WAY CLUTCH AND TORQUE DETECTION APPARATUS USING SAME

(75) Inventors: Akihito Yoshiie, Shiga (JP); Kyosuke Kokatsu, Shiga (JP)

(73) Assignee: Sunstar Suisse SA, Ecublens (CH)

( * ) Notice: Subject to any disclaimer, the term of this patent is extended or adjusted under 35 U.S.C. 154(b) by 0 days.

(21) Appl. No.: 10/380,859

(22) PCT Filed: Oct. 10, 2001

(86) PCT No.: PCT/JP01/08875

§ 371 (c)(1),
(2), (4) Date: Mar. 18, 2003

(87) PCT Pub. No.: WO02/33279

PCT Pub. Date: Apr. 25, 2002

(65) Prior Publication Data

US 2004/0084272 A1 May 6, 2004

(30) Foreign Application Priority Data

Oct. 13, 2000 (JP) ........................... 2000-313893

(51) Int. Cl.[7] ............................. F16D 41/30; G01L 3/14
(52) U.S. Cl. ........................... 192/46; 192/54.5; 192/64
(58) Field of Search ........................... 192/46, 64, 54.1, 192/54.5, 69.7, 69.81, 69.83, 93 A; 74/575

(56) References Cited

U.S. PATENT DOCUMENTS

| | | | | |
|---|---|---|---|---|
| 4,261,213 A | * | 4/1981 | Rattunde | 476/9 |
| 4,428,249 A | * | 1/1984 | Henk | 74/412 TA |
| 5,845,727 A | | 12/1998 | Miyazawa et al. | |
| 6,523,659 B2 | * | 2/2003 | Kanehisa et al. | 192/64 |

FOREIGN PATENT DOCUMENTS

| | | |
|---|---|---|
| EP | 0 683 093 | 11/1995 |
| EP | 0 763 462 | 3/1997 |
| EP | 839707 | 5/1998 |
| JP | 32-7631 | 7/1957 |
| JP | 4-100790 | 4/1992 |

(Continued)

OTHER PUBLICATIONS

Microfilm of the specification and drawings annexed to the written application of Japanese Utility Model Application No. 36893/1982 (Laid–open No. 141452/1983) (Sanyo Denki Kabushiki Kaisha), Sep. 22, 1983, Figs. 1, Figs. 2.

(Continued)

*Primary Examiner*—Saul Rodriguez
(74) *Attorney, Agent, or Firm*—Wenderoth, Lind & Ponack, L.L.P.

(57) ABSTRACT

A power-assisted bicycle is provided with a one-way clutch that can also be used as a torque detection apparatus. The one-way clutch has a tooth part (112) mounted on a driven means and a piece part (100) mounted slidably yet non-rotatably on a drive shaft (4). The tooth part has a first engagement face (121) formed with a plurality of teeth (114) and the piece part has a second engagement face (110) formed with a plurality of pieces (102). The first engagement face and the second engagement face are disposed facing each other generally perpendicularly to the axial direction. A disc spring (124) is disposed on the rear face of the piece part. As the piece part rotates in the direction of running forward, the piece is engaged with a sharply sloping face of the tooth to engage with the tooth and the angle of the piece with respect to the second engagement face increases, whereby the piece slides so as to increase the distance from the tooth part in resistance to the disc spring. As the piece rotates in the opposite direction, the piece abuts with the gently sloping face of the tooth and the angle of the piece with respect to the second engagement face is made smaller to decrease the distance from the tooth part by means of the elasticity of the disc spring.

35 Claims, 17 Drawing Sheets

FOREIGN PATENT DOCUMENTS

| | | |
|---|---|---|
| JP | 9-123978 | 5/1997 |
| JP | 10-14982 | 1/1998 |
| JP | 10-226387 | 8/1998 |
| JP | 10-250672 | 9/1998 |
| JP | 11-248566 | 9/1999 |
| JP | 2000-203484 | 7/2000 |
| WO | 00/75006 | 12/2000 |

OTHER PUBLICATIONS

Microfilm of the specification and drawings annexed to the written application of Japanese Utility Model Application No. 36768/1986 (Laid–open No. 153433/1987) (Ou Shisei), Sep. 29, 1987, Figs. 1, Figs. 2.

* cited by examiner

Fig. 7
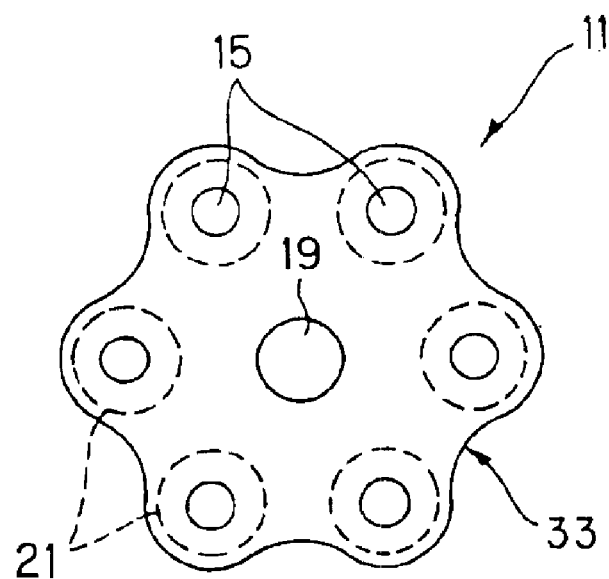
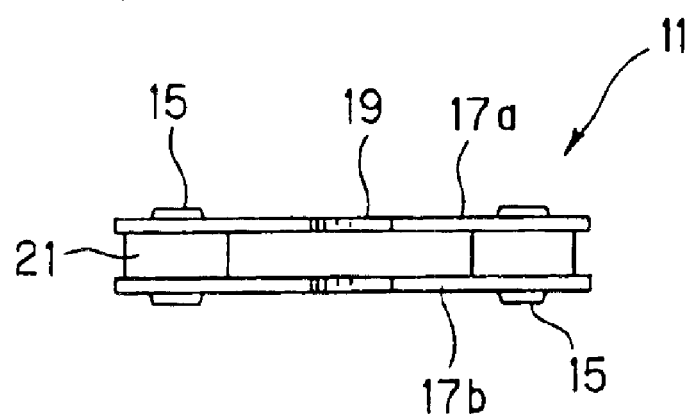

Fig. 12
(a)
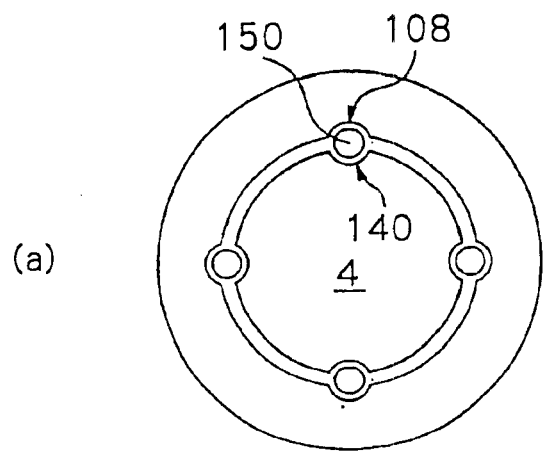
(b)
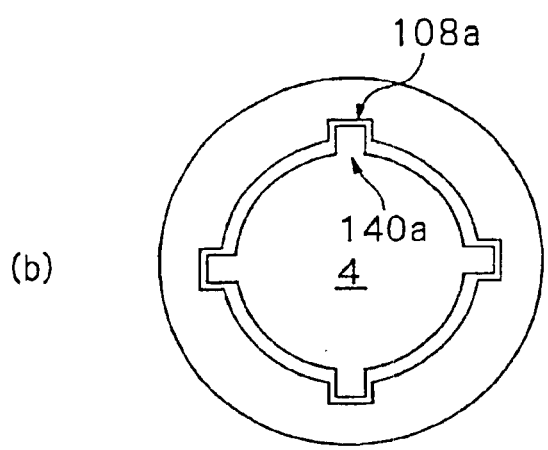
(c)
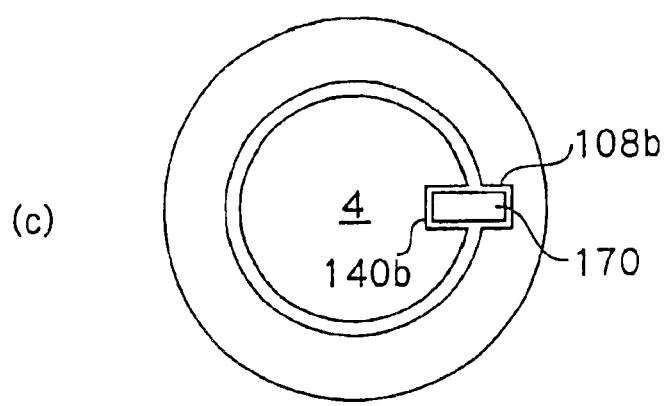

Fig. 14
(a) 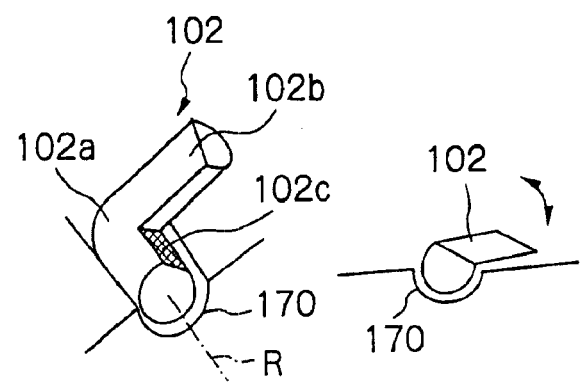
(b) 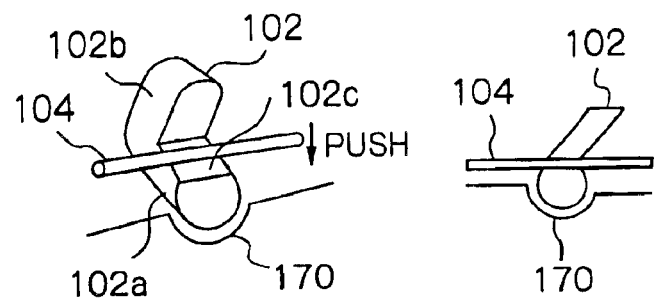
Fig. 15
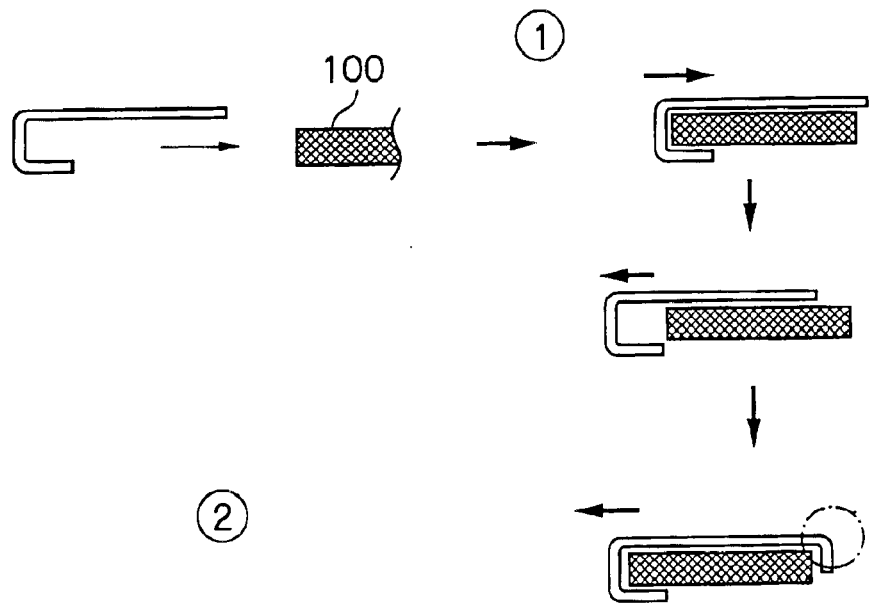

ONE-WAY CLUTCH AND TORQUE DETECTION APPARATUS USING SAME

TECHNICAL FIELD OF THE INVENTION

The present invention relates to a one-way clutch capable of transmitting only a one-way rotation along an axial direction thereof and a torque detection apparatus with the one-way clutch, adapted so as to detect the torque provided to the one-way clutch.

BACKGROUND OF THE INVENTION

A conventional one-way clutch is composed of an inner ring with sawtooth-shaped teeth disposed on the periphery thereof and an outer ring with claws engageable with the teeth of the inner ring. This one-way clutch permits the transmission of the one-way rotation of the inner ring to the outer ring by engaging the sawtooth-shaped teeth of the inner ring with the claws of the inner ring only when the inner ring is rotated in that direction. Conversely, when the inner ring is rotated in the reverse direction, the engagement of the inner ring with the outer ring is released to allow the inner ring to idle.

Further, there are known various kinds of engagement mechanism systems for engaging the inner ring with the outer ring, in addition to the above mechanism system having a combination of the claws with the sawtooth-shaped teeth. One such conventional engagement mechanism system includes, for example, a mechanism system having a combination of a groove with a plurality of balls.

It is to be noted herein that a conventional one-way clutch can scarcely be considered to be used for purposes other than as a one-way clutch.

Further, such a conventional one-way clutch requires the use of a material or mechanism that can prevent stress deformation in an engagement member when stress generated upon engagement of the inner ring with the outer ring is transmitted to the engagement member as it is with no buffer.

The present invention has been completed with the above facts taken into account and on the basis of the finding as will be described hereinafter. Therefore, the present invention has the object to provide a one-way clutch that can also be used as a torque detection apparatus and further that can buffer stress generated upon engagement of an engagement member. Further, the present invention has as an object to provide a torque detection apparatus using the one-way clutch according to the present invention.

SUMMARY OF THE INVENTION

In order to achieve the above objects, the present invention provides a one-way clutch adapted so as to convert at least a portion of the stress generated inside the clutch by the one-way rotation into a stress in the axial direction thereof and to allow the stress in the axial direction to resist elasticity.

This one-way clutch permits easy detection of an inside stress reflecting the torque generated due to the one-way rotation because at least a portion of the stress generated inside the clutch by the one-way rotation is converted into the stress in the axial direction and is opposed to elasticity. Therefore, the one-way clutch can further be used as a torque detection apparatus capable of detecting a torque generated by the one-way rotation, for example, by adding a detection system for detecting the stress in the axial direction thereof.

Moreover, the one-way clutch according to the present invention is provided with a mechanism in which the stress in the axial direction is opposed to elasticity so that this elasticity can work as a buffer for the stress generated inside the clutch by the one-way rotation.

The one-way clutch according to the present invention does not use the inner and outer rings used in the conventional technology. In a preferred mode of the present invention for converting the stress created by the one-way rotation into the stress in the axial direction, the one-way clutch comprises a first member and a second member disposed in a series along the axial direction thereof in such a manner that, on the one hand, the first member is engaged with the second member to halt the relative rotation between the first and second members and the first and second members are allowed to separate from each other in the axial direction thereof in resistance to elasticity, when either one of the first member or the second member is rotated in a one-way direction, and that, on the other hand, the first and second members are disengaged from each other to enable the relative rotation between the first and second members and the first and second members are allowed to come closer to each other in the axial direction thereof by the aid of elasticity when either one of the first and second members is rotated in the reverse direction.

In another preferred mode of the present invention for the arrangement of the first and second members, the first member has a first engagement face with a plurality of teeth formed thereon and the second member has a second engagement face with a plurality of pieces formed thereon in such a manner that the first and second members are arranged to face each other generally vertically to the axial direction thereof and that, when either one of the first and second members is rotated in the one-way direction, the pieces are allowed to engage between the adjacent teeth and, when either one of the first or second members is rotated in the reverse direction, the pieces are disengaged from the teeth.

In a further preferred mode of the present invention for the arrangement of the teeth and the pieces, each of the teeth is composed of a sharply sloping face and a gently sloping face with respect to the first engagement face in such a manner that each of the pieces is mounted on the second member so that the angle in the lengthwise direction with respect to the second engagement face is variable and that, on the one hand, when either one of the first or second members is rotated in the one-way direction, the piece is allowed to engage with the sharply sloping faces of the teeth to effect the engagement with the teeth and the angle thereof with respect to the second engagement face is increased and, on the other hand, when either one of the first and second members is rotated in the reverse direction, the piece is allowed to abut with the gently sloping face of the tooth and the angle thereof with respect to the second engagement face is decreased. Moreover, in a further preferred mode, the piece may be made of a rigid body and is pivotally disposed in such a manner that the lengthwise direction thereof is allowed to elastically pivot about the direction at a given angle with respect to the second engagement face.

In order to allow a smooth conversion of the inside stress into the stress in the axial direction thereof, either one of the first or second members may preferably be arranged so as to be slidable along the axial direction thereof and mountable on a drive system through a rotation-preventive system so as to prevent rotation relative to the drive system while the other may preferably be arranged so as to be connectable to a driven system. The rotation-preventive system may be comprised of, for example, a so-called ball spline arrangement or a key-groove arrangement.

It is also preferred that an elastic unit is disposed on the rear face opposite to the engagement face of either one of the first and second members mounted slidably in the axial direction through the rotation-preventive system. The elastic unit can appropriately provide elasticity in resistance to the stress in the axial direction thereof.

The elastic unit may preferably be in a generally flat form having a length in the axial direction thereof shorter than the length in the radial direction thereof. This elastic unit can assist in shortening the axial size of the one-way clutch.

By locating the detection system for detecting a stress deformation of the elastic unit, a torque detection apparatus can be realized which readily detects the torque produced by the one-way rotation. Preferably, the detection system includes a plurality of deformation sensors mounted at plural locations of the elastic unit in such a manner that the torque may be detected on the basis of an average value of output signals from the plural deformation sensors. This can improve the S/N ratio of the torque detection signals.

Other embodiments and effects of the present invention can become apparent in the course of the following description with reference to the accompanying drawings.

BRIEF DESCRIPTION OF THE DRAWINGS

FIG. 7 is a front view and a side view showing the sprocket drive gear.

FIG. 12 is a view showing an example of a rotation-preventive system for preventing the relative rotation of a piece part with respect to a drive shaft, in which (a) is a plan view showing a brief structure of a ball spline type; (b) is a plan view showing a brief structure of a spline key type; and (c) is a plan view showing a brief structure of a key-groove type.

FIG. 14 is a view for describing the action of the spring bar, in which (a) is a view showing a state in which no spring bar is mounted; and (b) is a view showing a state in which the spring bar is mounted.

FIG. 15 is a view for describing the advantages of the spring bar.

DESCRIPTION OF THE PREFERRED EMBODIMENTS

Figure 1:
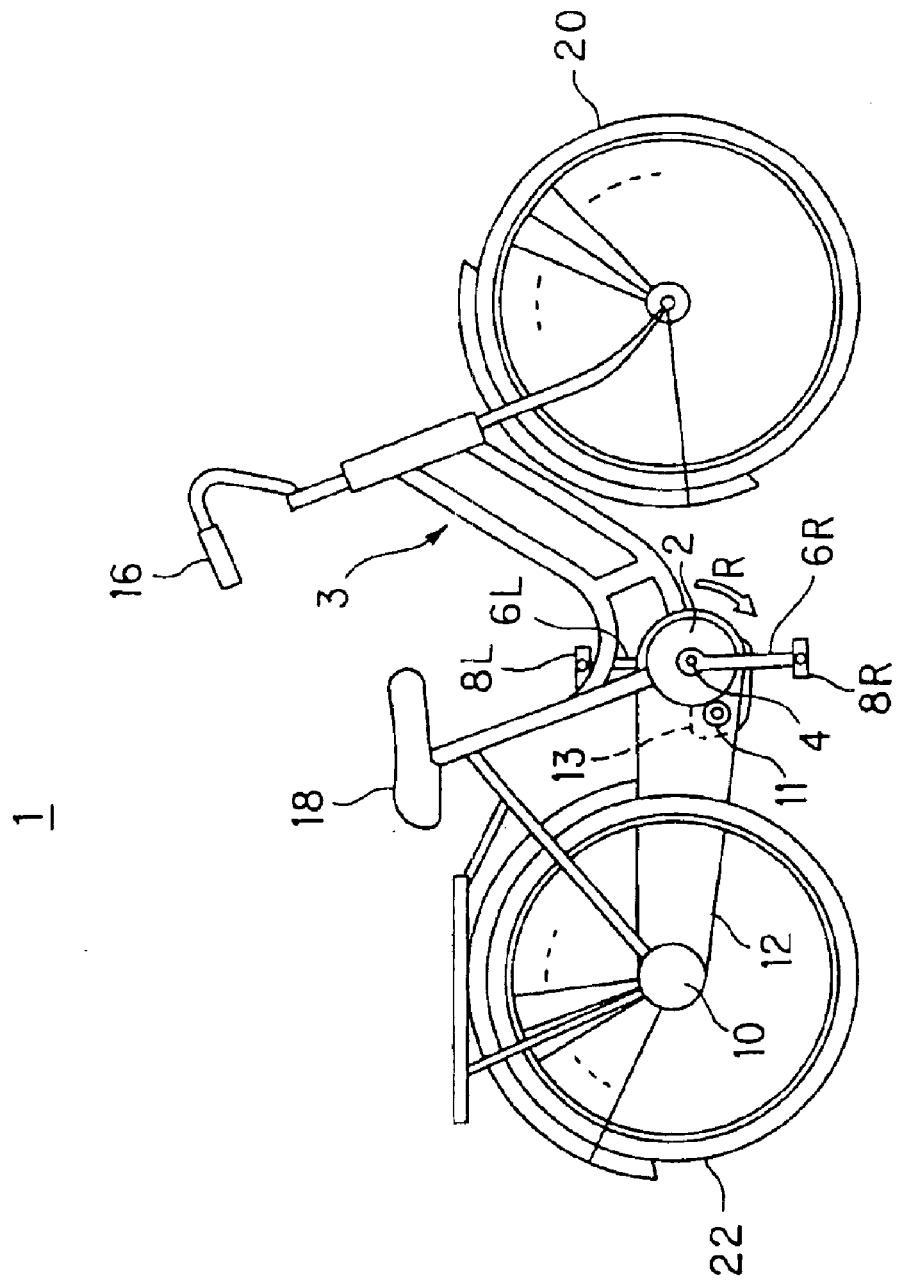
FIG. 1 is a brief illustration of a power-assisted bicycle to which a one-way clutch and a torque detection apparatus according to the present invention are applied.

The one-way clutch (the ratchet gear) and the torque detection apparatus using the one-way clutch according to the present invention will be described by taking, as an example, a power-assisted bicycle to which the one-way clutch (the ratchet gear) and the torque detection apparatus are applied, with reference to the accompanying drawings.
First Embodiment:

FIG. 1 is a brief representation of a power-assisted bicycle 1 to which the one-way clutch (the ratchet gear) and the torque detection apparatus using the one-way clutch according to the first embodiment of the present invention are applied. As shown in FIG. 1, a major skeleton structure of the power-assisted bicycle 1 comprises a body frame 3 made of a metallic tube and various elements including a front wheel 20, a handlebar 16 for steering the front wheel, a rear wheel 22, a saddle 18 and so on are mounted on the body frame 3 in a conventional manner as with an ordinary bicycle.

At a central lower portion of the body frame 3, a drive shaft 4 is held on the body frame 3 so as to be rotatable, and pedals 8L and 8R are mounted at the left-hand and right-hand end portions of the drive shaft 4 through crank shafts 6L and 6R, respectively. A sprocket 2 as the driven side is coaxially mounted on the drive shaft 4 as the driving side through a ratchet gear, as will be described in more detail, and the ratchet gear is arranged to transmit only the rotational torque in a one-way direction (in the direction R) of moving the bicycle 1 forward from the driving side to the driven side.

Moreover, at the central portion of the rear wheel 22, a rear-wheel power mechanism system 10 is disposed to provide the rear wheel 22 with the pedaled force transmitted, an endless chain 12 is wound between the sprocket 2 and a free wheel (not shown) disposed inside the rear-wheel power mechanism system.

The pedaled force in the advancing direction provided by the pedal 8 rotates the drive shaft 4 through a crank bar 6, and the rotating force acts on the sprocket 2 as the pedaled torque in the direction R in the drawing and rotates the sprocket 2 transmitting the pedaling torque to the rear-wheel power mechanism system 10 through the chain 12 and as a consequence rotating the rear wheel 22 and running the bicycle 1 forward.

Then, a description will be given regarding the configuration of the torque detection mechanism system according to this embodiment of the present invention with reference to FIGS. 2 to 5.

Figure 3:
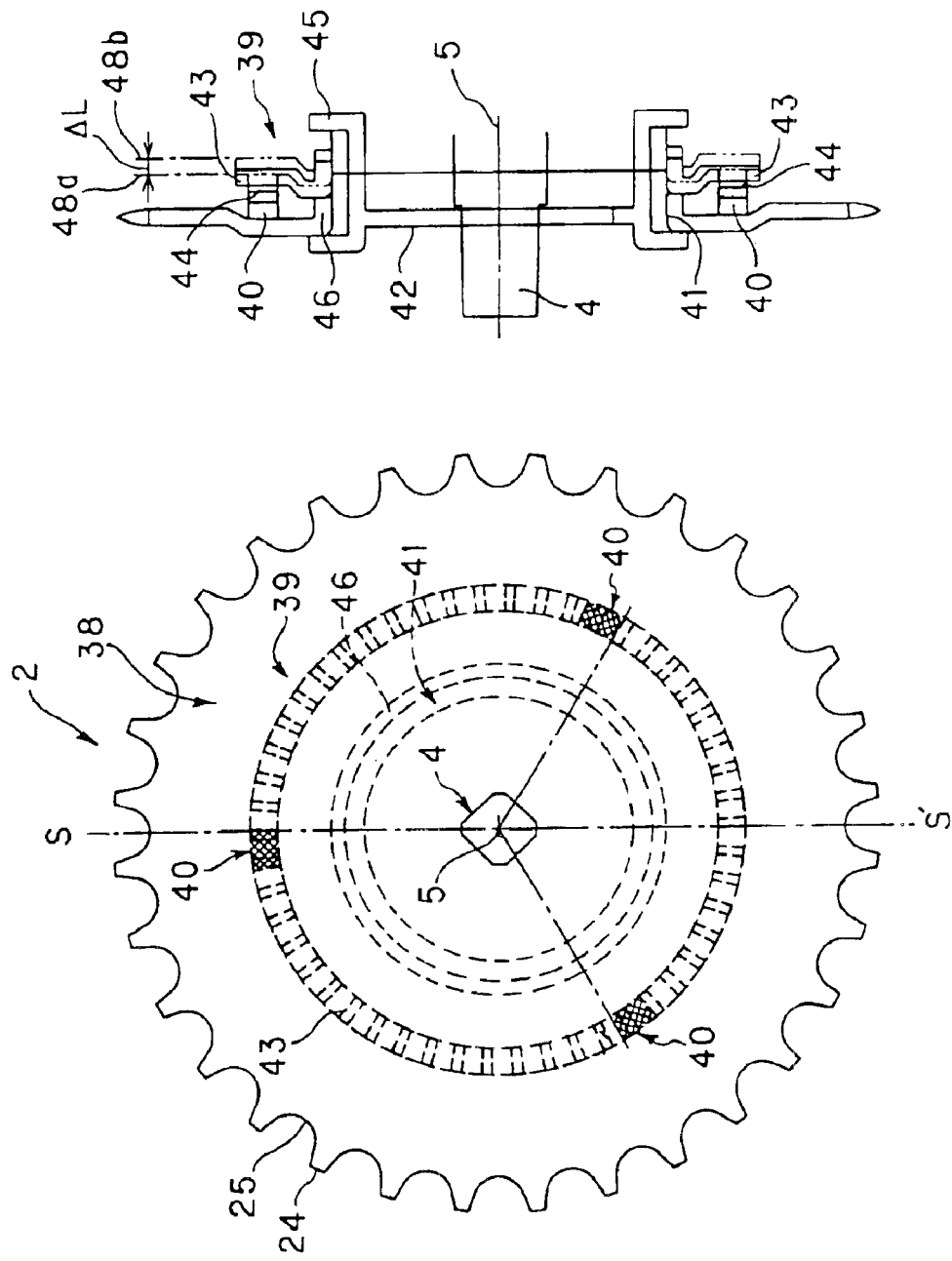
FIG. 3 is a front view and a side view showing an engaged state of a sprocket and a ratchet gear, each for use with the torque detection apparatus according to the first embodiment of the present invention.

Referring first to FIG. 3, there are shown a front view of the sprocket 2 and a ratchet gear 39 connected to the sprocket 2 and a side view in section of the sprocket 2 and the ratchet gear 39, when taken along line S–S' of the front view. As shown in the front view, the sprocket 2 comprises a rigid body portion 38 with a plurality of teeth 24 and depressions 25 between the adjacent teeth 24, a chain 12 being wound on the outer periphery of the rigid body portion 38. The rigid body portion 38 is provided at its central portion with a bore 41 through and into which the drive shaft 4 is inserted, and a cylindrical stopper 46 is provided surrounding the circumference of the bore 41.

The ratchet gear 39 includes three ratchet pieces 40 and a ratchet tooth portion 43. The three ratchet pieces 40 are each disposed in a fixed manner on the body portion 38 of the sprocket 2 at an equal angle in a spaced relationship apart in an equal distance from the center of the sprocket (agreeing with the drive shaft line 5 in the drawing). The ratchet tooth portion 43 is disposed on the one face side of the sprocket 2 so as to be engageable with the ratchet pieces 40.

The sectional side view of FIG. 3 illustrates a state in which the sprocket 2 and the ratchet gear 39 are mounted on the drive shaft 4. As shown in this figure, a drive shaft 42 is concentrically disposed around the drive shaft 4 in a fixed manner so as to fail to move about the shaft. The drive shaft 42 is provided at the outer periphery thereof with a seat 45 having a cylindrical shaft face generally parallel to the drive shaft line 5. The seat 45 has the sprocket 2 and the ratchet tooth portion 43 disposed in an engaged state. The sprocket 2 is arranged in such a manner that it can rotate separately and independently from the drive shaft 42 within the seat 45 in the direction in which no clutch of the ratchet gear acts, while the ratchet tooth portion 43 is fixed to the drive shaft 42 in a manner as will be described hereinafter.

Now, a description will be given regarding the state of engagement of the sprocket 2 with the ratchet tooth portion 43 and the clutch function with reference to FIGS. 4 and 5.

Figure 4:
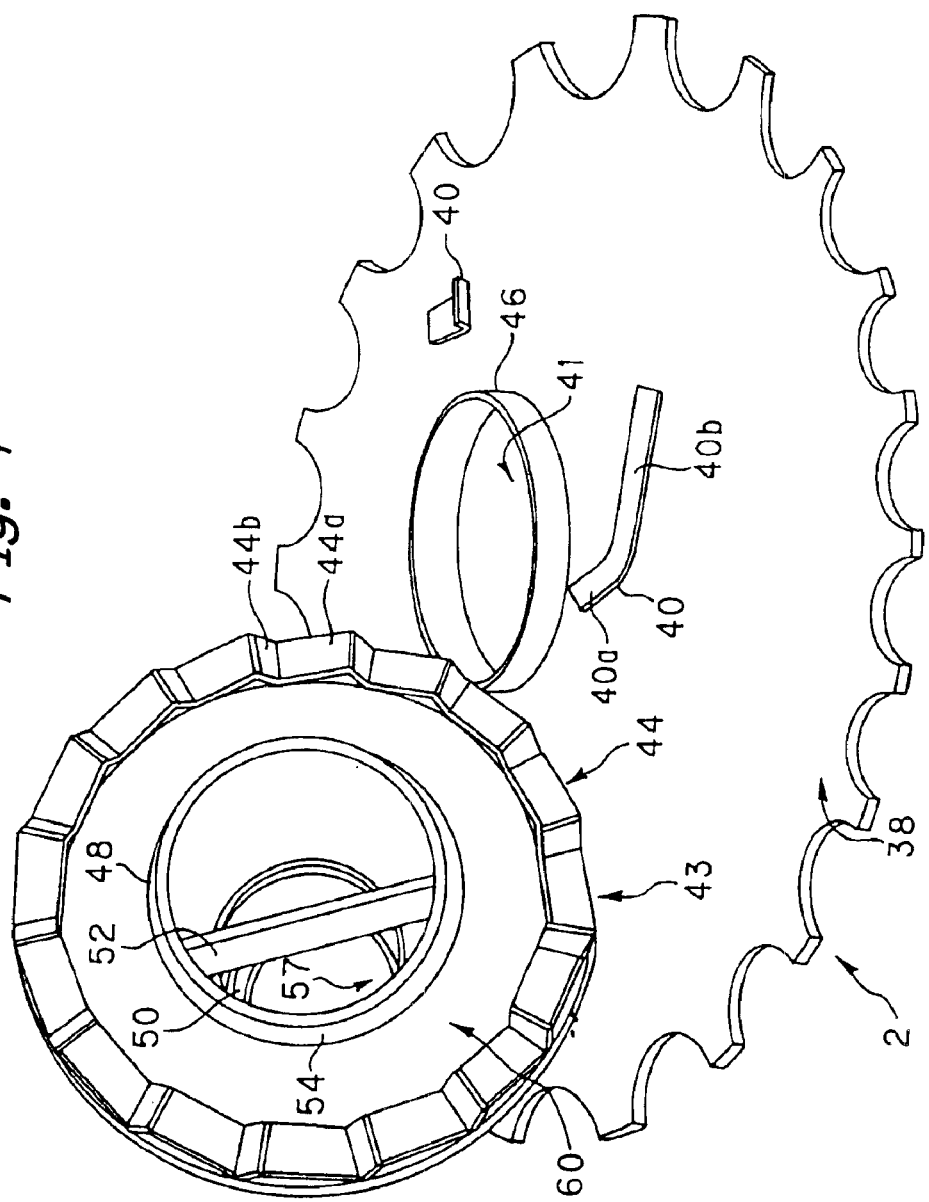
FIG. 4 is a diagrammatically perspective illustration showing an exploded view of the sprocket and a ratchet tooth part.

FIG. 4 is a diagrammatically perspective representation of an exploded state of the sprocket 2 and the ratchet tooth portion 43. As shown in FIG. 4, the ratchet pieces 40 are each formed as a backstop-shaped member with a slenderly elongated, flat and elastic bent plate made of a metal, and a rear portion 40b of the ratchet piece 40 is fixed to the body portion 38 of the sprocket 2 by welding or any other appropriate means in such a manner that an end portion 40a of the backstop-shaped member is disposed inclining at a predetermined angle with respect to the body portion 38 thereof.

The ratchet tooth portion 43 has a disk part 60 with a flat surface. On the flat surface of the disk part 60 on the side facing the sprocket face, there are formed a plurality of teeth 44 over the entire outer periphery thereof, which can be engaged with the ratchet pieces 40. Each of the teeth 44 has a gradually sloping face 44a and a sharply sloping face 44b. Moreover, the disk part 60 is provided at its central portion with a cylindrical center shaft 54 extending axially and protruding outwardly toward the both sides thereof from the flat surface of the disk part 60. The center shaft 54 is provided with a through aperture 57 that can receive the drive shaft 42 disposed about the drive shaft 4. Inside the center shaft 54 at the opposite side facing the sprocket face of the disk part 60, a baffle portion 52 in the form of a flat plate is coupled with and fixed to the inner shaft wall so as to bridge the through aperture 57 in the diametrical direction. Further, a coil spring 50 is inserted in the center shaft 54 so as for a one end portion of the coil spring 50 to come into abutment with the baffle portion 52 and for the other end portion thereof to be fixed to a drive shaft, although not shown.

Figure 5:
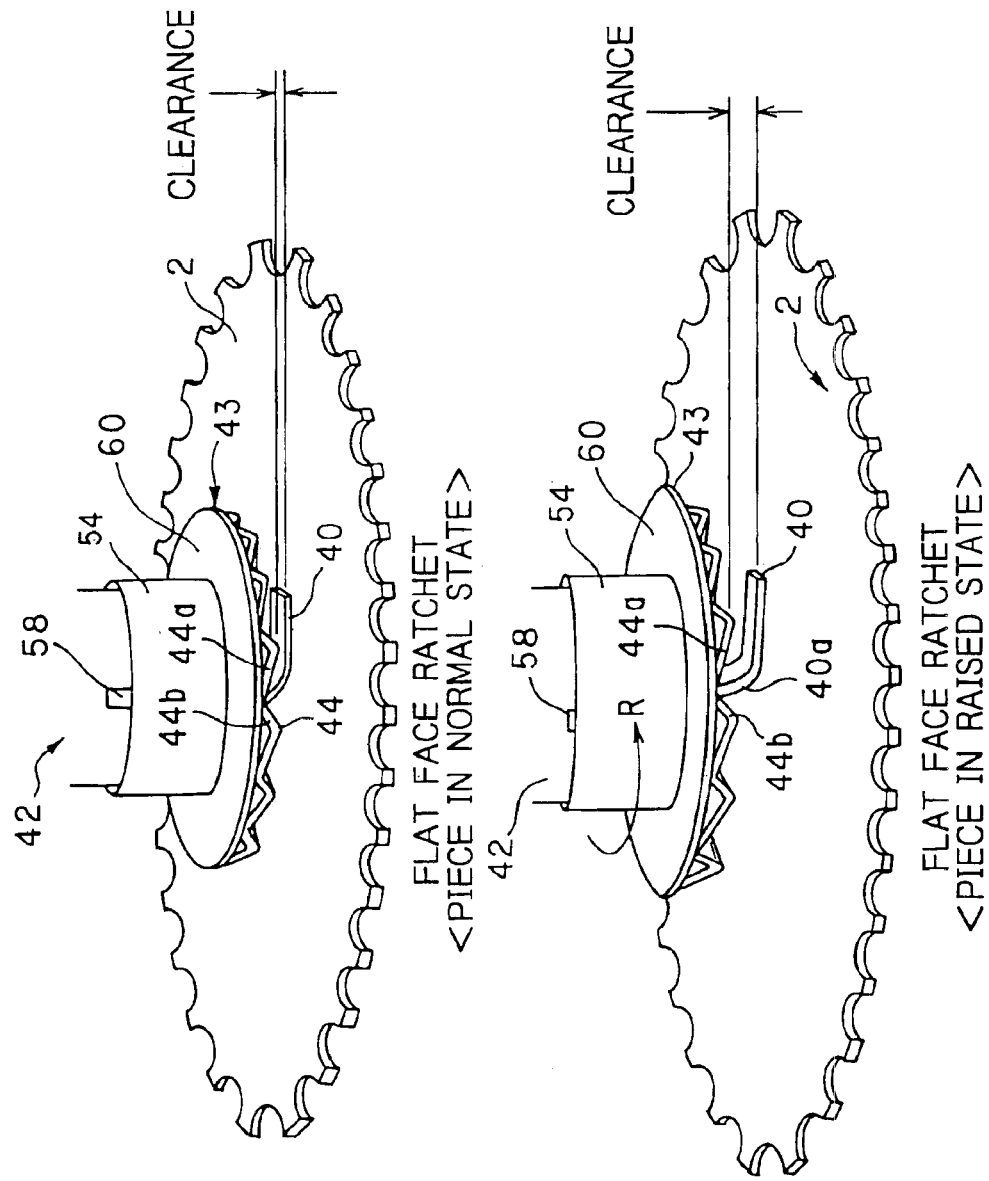
FIG. 5 is a diagrammatically perspective illustration showing an engaged state of the sprocket with the ratchet gear in order to describe an axial displacement of the ratchet tooth part.

In the state of engagement of the sprocket 2 with the ratchet tooth portion 43, the end portion 40a of the ratchet piece 40 can enter into the depression defined by the adjacent sloping faces 44a and 44b and the topmost end part thereof comes into abutment with the depression in a state opposite to the sharply sloping face 44b, as shown in FIG. 5. The aperture 57 of the center shaft 54 receives the drive shaft 42. In this case, although not shown in the drawings, the baffle portion 52 is inserted in a further elongated slot 58 formed so as to penetrate through the shaft portion along the axial direction of the drive shaft 42. This structure allows the ratchet tooth portion 43 to rotate together with the drive shaft 4 rotatable by the pedaled torque, although it does not rotate with respect to the drive shaft 42. As the axial width of the baffle portion 52 is set to be shorter than the length of the slot 58, the baffle portion 52 can slide in the axial direction along the slot 58. At this time, the baffle portion 52 is engaged at the height at which the topmost end portion of the ratchet piece 40 is engaged with the ratchet tooth portion 43 because it is biased by the coil spring 50 in the direction toward the sprocket 2.

As shown in the lower part of FIG. 5, as the drive shaft 42 rotates in the direction R corresponding to the direction of the bicycle 1 running forward, the ratchet tooth portion 43 and the sprocket 2 are allowed to rotate together in the direction R, together with the drive shaft 42, because the topmost end portion of the ratchet piece 40 does not slide along the sloping face due to the abutment with the sharply sloping face 44b of the tooth 44. On the other hand, as the drive shaft 42 rotates in the direction opposite to the direction R, the topmost end portion of the ratchet piece 40 is not engaged with the sloping face and slides along it because the rear face of the end portion 40a of the ratchet piece 40 comes in abutment with the gradually sloping face 44a thereof, whereby no rotation of the drive shaft 42 is transmitted to the sprocket 2. This is the principle of the one-way clutch mechanism of the ratchet gear 39.

When the rotation of the drive shaft 42 as in the direction R is transmitted to the sprocket 2 through the ratchet tooth portion 43, the elastic ratchet piece 40 is caused to arise in resistance to the rotational force applied by the sharply sloping face 44b, as shown in the lower part of FIG. 5. Therefore, the ratchet tooth portion 43 is caused to displace in the axial direction from the ordinary axial position (the position 48a of FIGS. 2 and 3) apart from the sprocket 2 in resistance to the biasing force of the coil spring 50 and to cease at the position (the position 48b of FIGS. 2 and 3) at which the rotational force by the pedaled force is balanced with the elasticity of the ratchet piece 40. As the pedaled torque is decreased, the rotational force applied by the sharply sloping face 44b becomes smaller, so that the ratchet piece 40 is forced to recover to its original position due to its elasticity and at the same time the ratchet tooth portion 43 biased downwardly by the coil spring 50 is caused to displace in the axial direction as approaching to the sprocket 2. Therefore, an amount ΔL of axial displacement (FIG. 3) of the ratchet tooth portion 43 reflects a magnitude of the pedaled torque.

Figure 2:
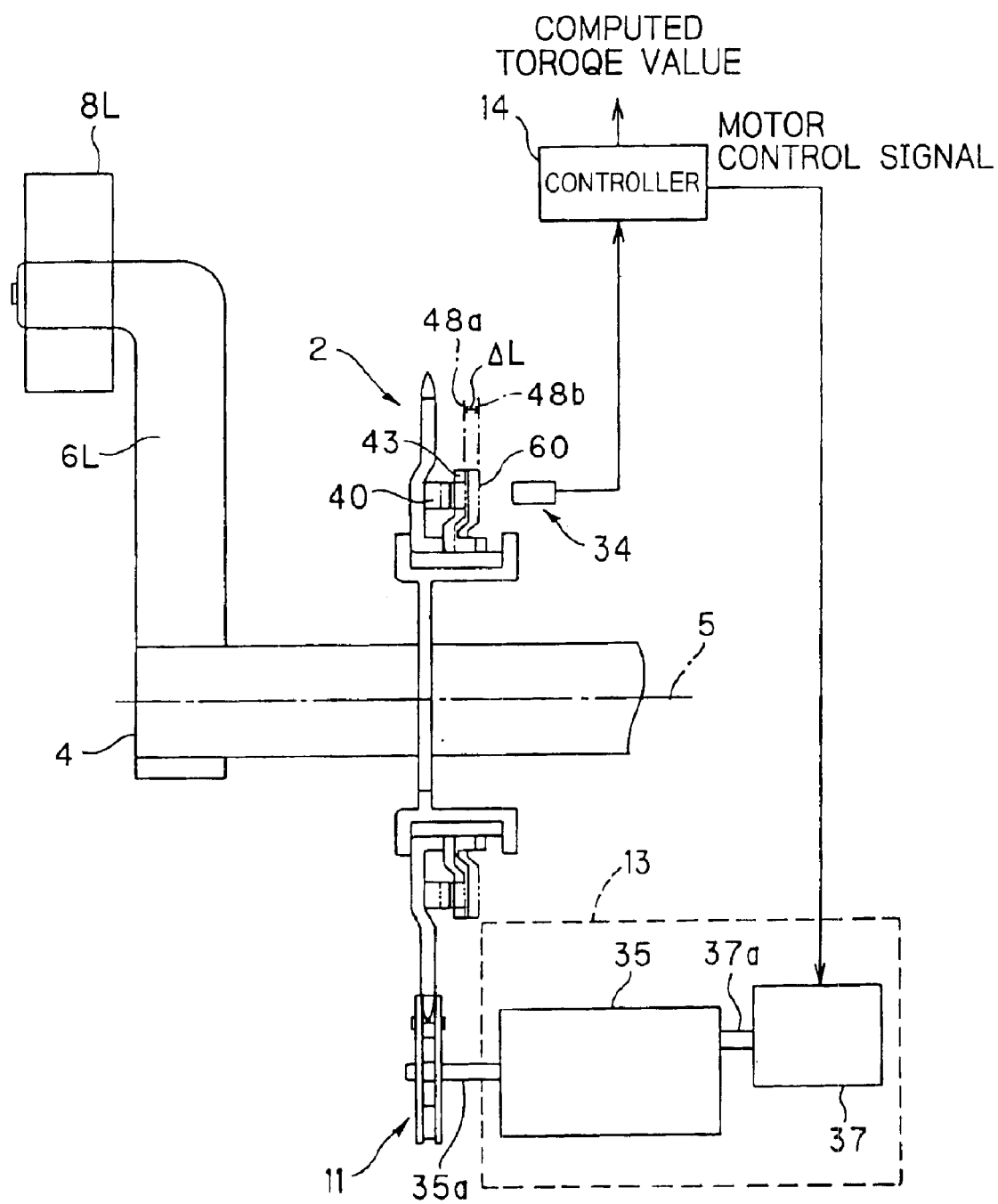
FIG. 2 is an illustration of a torque detection apparatus according to a first embodiment of the present invention.

In order to detect the amount of the axial displacement of the ratchet tooth portion 43, a position sensor 34 may be mounted on the frame of the bicycle body so as to detect an axial distance from a predetermined position to the disk part 60 of the ratchet tooth portion 43, as shown in FIG. 2. The position sensor 34 may be realized, for instance, by a detecting member made of a magnetic material such as ferrite or the like, mounted so as to move axially in accordance with the axial displacement of the disk part 60, a coil disposed in the vicinity of the detecting member, and a detection circuit capable of electrically detecting a variation in inductance of the coil as a variation in impedance. In the case of this arrangement, although the detecting member comes closer to the coil or goes apart therefrom in accordance with the amount of the axial displacement of the ratchet tooth portion 43, the inductance of the coil can vary with the distance between the detecting member and the coil so that the axial distance L1 up to the ratchet tooth portion 43 can be computed by the detection of this variation in the inductance by the detection circuit. It is to be understood herein as a matter of course that, as long as the axial distance or the amount ΔL of the axial displacement of the ratchet tooth portion 43 can be detected, a sensor of an optional type other than the type as described above can also be used, and some sensors may also be disposed inside the ratchet gear 39.

The output end of the position sensor 34 is connected to a controller 14 that receives a detection signal from the sensor. The controller 14 may be realized by a microcomputer or the like and have operational functions for computing a value of the pedaled torque on the basis of the received detection signal relating to the axial distance.

Then, a power-assisting system according to this embodiment of the present invention will be described hereinafter. As shown in FIG. 2, the power-assisting system may comprise a sprocket drive gear 11 engageable directly with the sprocket 2, an electric motor 37 rotatably driven by a battery, although not shown, and transmitting the assisting torque by the aid of a rotary shaft 37a, a reduction gear mechanism 35 for reducing the rotational speed of the electric motor 37 around the rotary shaft 37a and transmitting the rotary movement to the sprocket drive gear 11 via a gear shaft 35a, and the controller 14 for controlling the electric motor 37 on the basis of the computed value of the pedaled torque.

The reduction gear mechanism 35 may comprise, for example, a combination of plural gears and so on. In the middle portion of the transmission passage of the assisting torque, which is composed of the gears and so on, there may be disposed a so-called one-way clutch (although not shown) for transmitting power in only one direction. The one-way clutch is arranged in such a manner that it can transmit the assisting torque from the electric motor 37 to the sprocket drive gear 11, but it cannot transmit it in the reverse direction, that is, in the direction from the sprocket drive gear to the reduction gear mechanism 35. This arrangement can ensure an always smooth and light operation of the bicycle without transmitting any load of the electric motor 37 to the sprocket 2 at the time of non-driving.

Figure 6:
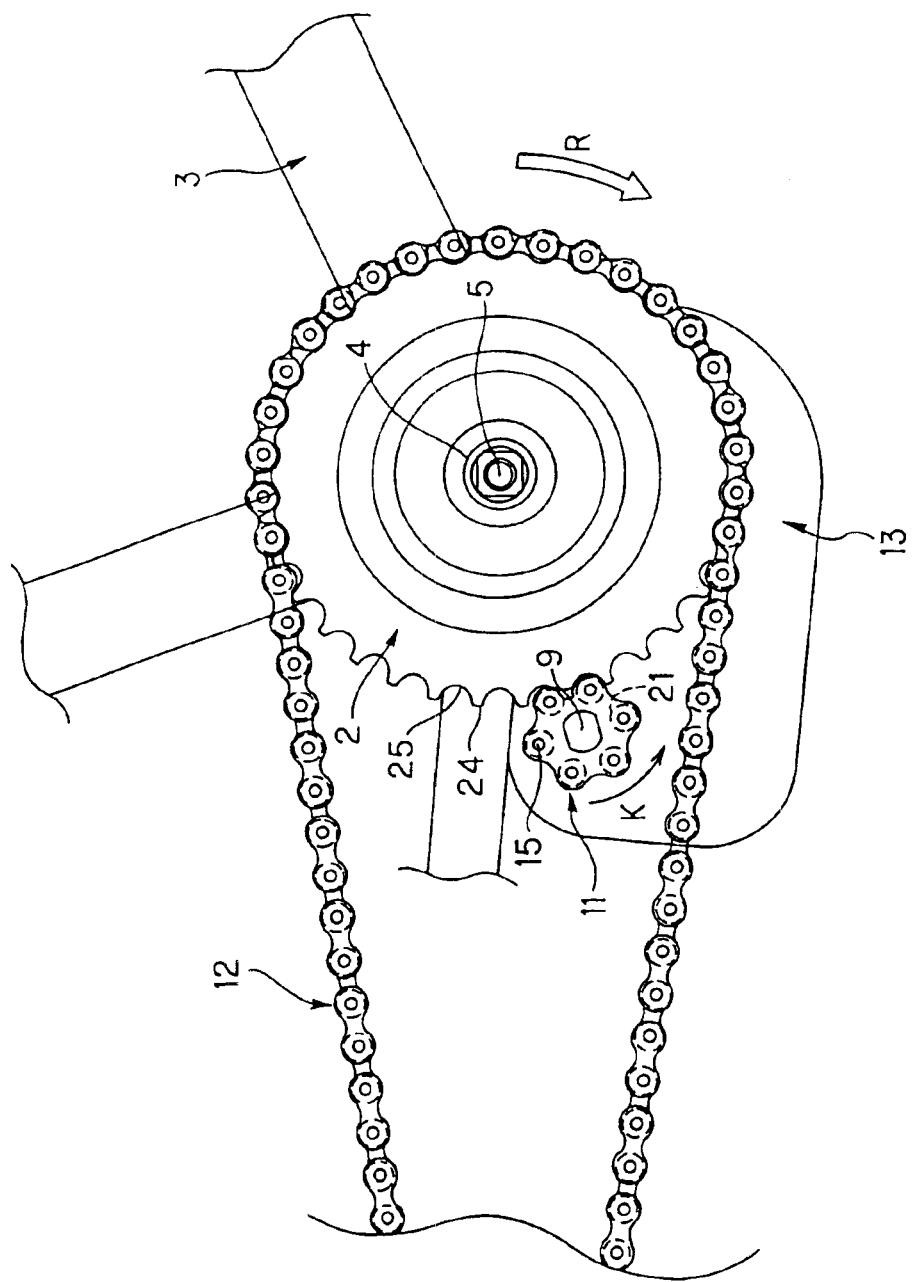
FIG. 6 is a front view showing a sprocket and a sprocket drive gear for use with the torque detection apparatus according to the first embodiment of the present invention.

A front view of the state of engagement of the sprocket drive gear 11 with the sprocket 2 is shown in FIG. 6 (in which the crank bar is omitted). As shown in FIG. 6, the chain 12 wound on the sprocket 2 comprises an arrangement in which pin links are alternately combined with roller links, the pin link being disposed in such a manner that two pins are forced into two ring plates of a cocoon type and the roller link being disposed in such a manner that two bushes are forced into two ring plates and a roller is inserted in the outer periphery of the bush so as to be rotatable. For each roller constituting the pin link and the roller link of the chain 12, the pitch and the diameter of the roller are defined so as to come into engagement with each tooth of the sprocket 2.

The sprocket drive gear 11 may be engaged with the sprocket 2, for example, as shown in FIG. 7, in substantially the same manner as the chain 12 is. The sprocket drive gear 11 may comprise two roller plates 17a and 17b disposed in a parallel arrangement, a plurality of cylindrical bushes (a roller shaft) 15 each being generally vertically forced into the plates at the pitch equal to that of the roller of the chain 12 along the peripheral region of the plates so as to connect the plates to each other, and a plurality (six in this example as shown in the drawing) of cylindrical roller 21 each being inserted rotatably so as to cover the outer periphery of each of the bushes. Each of the roller plates 17a and 17b is provided at its central portion with a mounting aperture 19 through and on which a drive unit 13 is mounted. At an outer peripheral portion of the sprocket drive gear 11 between the adjacent rollers 21 is formed a depression 33' depressed inwardly.

The two adjacent rollers 21 of the sprocket drive gear 11 are engaged with the depressions 25 of the sprocket 2 and one tooth 24 of the sprocket 2 is allowed to enter into a clearance between the rollers, as shown in FIG. 6. The depression 33' of the sprocket drive gear 11 is preferably formed so as for the tooth of the chain 12 to be engageable readily into the rollers 21. For example, it is preferred that the depression 33' is shaped in substantially the same form as a narrow central part of the link plate of the chain 12 in a cocoon form.

Then, a description will be given regarding the action of the first embodiment of the present invention with reference to the accompanying drawings.

As the driver presses the pedals 8R and 8L down to rotate the drive shaft 4 in the direction R, the ratchet tooth portion 43 fixed non-rotatably on the drive shaft 4 by the aid of the baffle portion 52 is allowed to rotate together with the drive shaft 4 and apply the pedaled torque to the sprocket 2 through the ratchet pieces 40 engaged with the teeth 44 of the ratchet tooth portion 43, the sprocket 2 on which the tensile force from the chain 12 acts as a load. At this time, the elastic ratchet pieces 40 are caused to arise in resistance to the rotational force applied from the sharply sloping faces 44b of the ratchet teeth, and the ratchet tooth portion 43 is caused to displace in the axial direction so as to become apart from the sprocket 2 from the ordinary axial position (the position 48a of FIG. 3), while resisting the biasing force of the coil spring 50, and cease at the position (the position 48b of FIG. 3) at which the rotational force by the pedaled force and the elasticity of the ratchet pieces 40 are well balanced.

Turning now to FIG. 2, the position sensor 34 always senses the axial distance from its fixed position to the disk portion 60 of the ratchet tooth portion 43 and transmits the detection signal (corresponding to the position 48b) to the controller 14. Then, the controller 14 determines the amount ΔL of the axial displacement from a difference between the position 48a of the ratchet tooth portion 43 at the time when the pedaled torque saved in advance with an inner memory does not act thereon and the position 48b thereof represented by the received detection signal. As the amount ΔL of the axial displacement becomes larger as the pedaled torque becomes larger, the controller 14 can compute the value of the pedaled torque from the relationship of the above two elements. This can be realized, for example, by experimentally determining the relationship of the amount ΔL of the axial displacement with the pedaled torque and saving a reference table representative of this relationship in the inner memory of the controller 14.

Then, the controller 14 determines the assisting torque Te to be applied at least on the basis of the pedaled torque T computed and then computes the control signal giving an instruction to the electric motor 37 to electrically drive and rotate the motor by means of the assisting torque. Thereafter, the controller 14 outputs the control signal. It is also possible to mount a bicycle speed sensor on the bicycle and compute the assisting torque Te on the basis of the pedaled torque T and the bicycle speed.

For instance, in the case of the simplest power-assisted control, as the pedaled torque T computed reaches a predetermined value or higher, the motor control signal is generated giving an instruction to turn the electric motor 37 on and produce the assisting torque so as to maintain a predetermined ratio with respect to the pedaled torque. In other cases, the controller 14 generates a motor control signal giving an instruction to turn the electric motor 37 off. In this case, the electric motor 37 may be turned on by directly utilizing the amount ΔL of the axial displacement only when this value reaches the predetermined value or higher.

As the electric motor 37 is turned on and rotates, the rotational force is transmitted to the sprocket drive gear 11 through the reduction gear mechanism 35 and the sprocket drive gear 11 rotates about the central drive shaft 9 thereof in the direction K as shown in FIG. 6. At this time, each of the rollers 21 is allowed to engage with the depressions 25 of the sprocket 2 one after another, while the sprocket 2 provides the drive torque in the direction R about the central shaft line 5 of the drive shaft 4. As described above, in this embodiment, the assisting torque from the electric motor 37 is transmitted through the sprocket drive gear 11 to the region of the sprocket 2 where highly rigid teeth 24 are formed, so that it can assist the pedaled force without bending the sprocket 2 and deviating the center of rotation. This allows the assisting torque to be added under the conditions where the pedaled torque is considered to reach a predetermined value or higher, the operation of pedaling the bicycle can be carried out with ease.

In the embodiment as described above, the torque can be computed on the basis of the amount of the axial displacement inside the ratchet gear that is also required for a general-use bicycle, without separately adding members and systems, including elastic members or transmitting mechanism system, each having high rigidity, volume and weight, to such a conventional bicycle, so that a space for the torque detection mechanism system and a weight thereof can be reduced to a great extent. This can also assist in simplifying the torque detection mechanism system.

Further, in this embodiment of the present invention, the assisting torque from the electric motor 37 is transmitted through the sprocket drive gear 11 to the outer periphery portion of the sprocket 2 having a large diameter, so that this-arrangement can offer the advantages and merits that a larger reduction ratio can be given than the arrangement in which the assisting torque is added from the drive shaft 4.

This can make the torque detection mechanism system smaller in size and lighter in weight as well as simplify the mechanism system.

Moreover, in this embodiment of the present invention, the power-assisted system is configured simply by including the elastically deformed portion of the torque detection mechanism system integrally in the ratchet gear and by locating the sprocket drive gear 11 and the drive system 13, so that no large modifications and changes of a frame structure of a conventional bicycle are required. Therefore, the power-assisted bicycle in this embodiment can further be made smaller in size and lighter in weight and reduce costs for manufacturing.

(Combined Force and Assisting Power Mechanism Systems)

Figure 17:
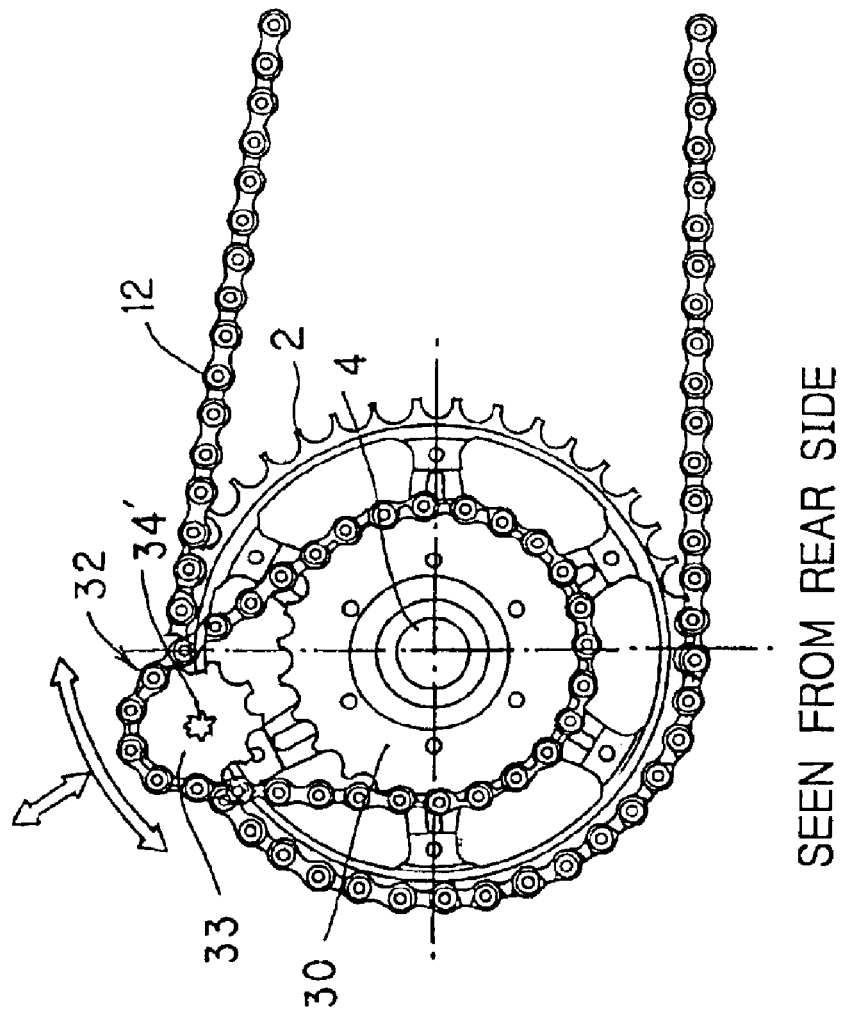
FIG. 17 is an enlarged front view showing a combined force mechanism system of a double chain type for a power-assisted bicycle according to another embodiment of the present invention, when seen from the rear side of the main sprocket.
Figure 18:
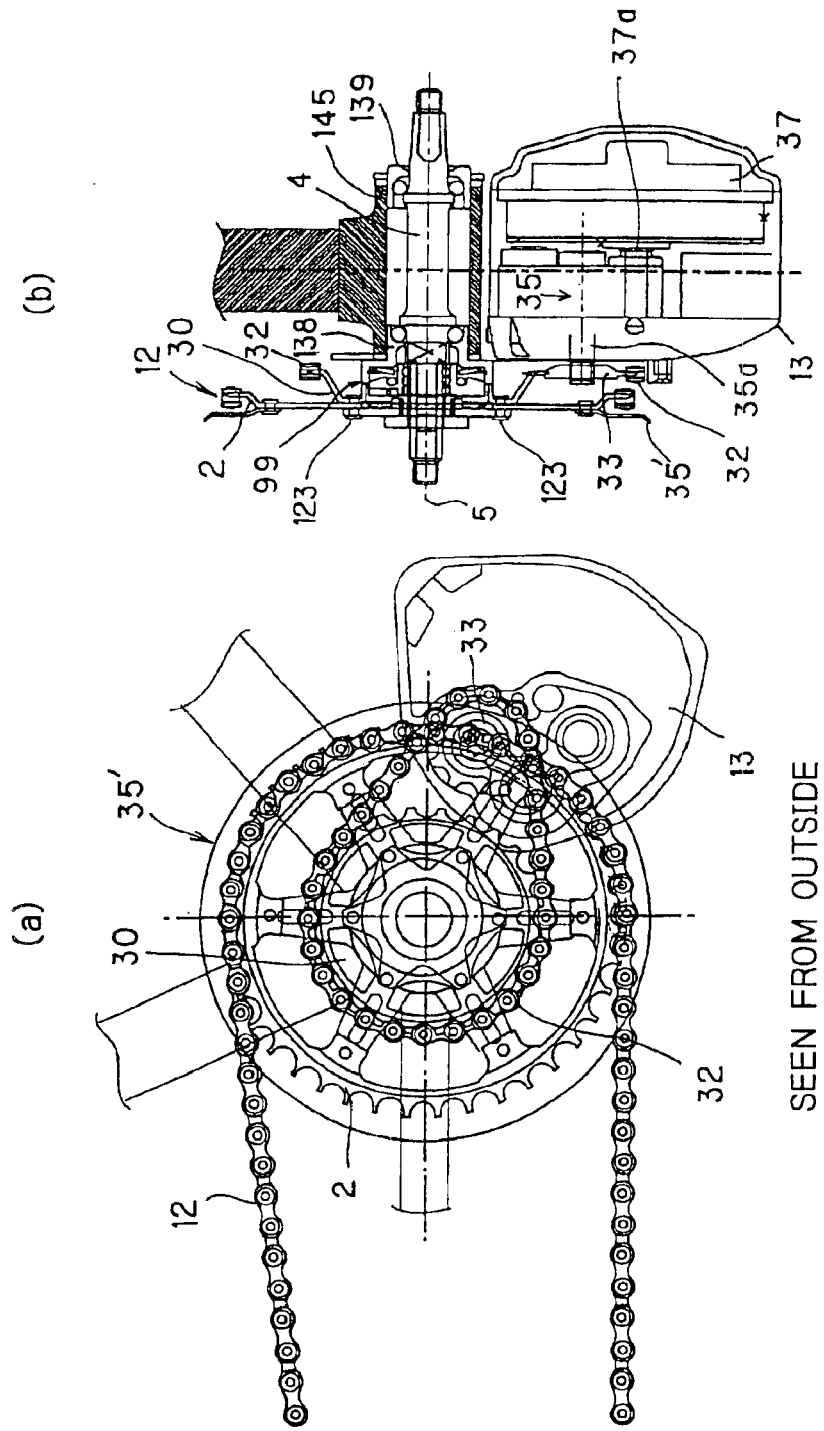
FIG. 18 is a view showing a combined force mechanism system according to the present invention, in which (a) is an enlarged front view when seen from the front side of the main sprocket and (b) is a side view in section.

A description will be given regarding an another embodiment of a combined force mechanism system combining assisting power and pedaling force with reference to FIGS. 16–18.

Figure 16:
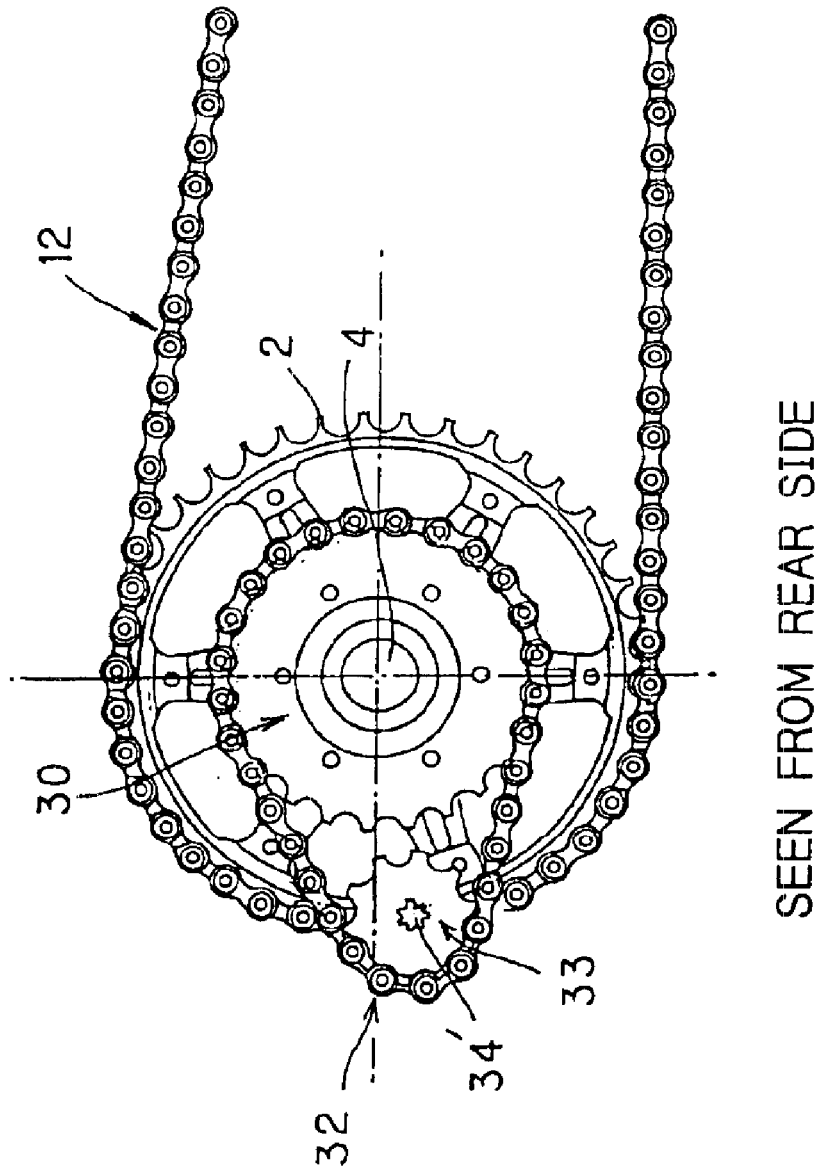
FIG. 16 is an enlarged front view showing a combined force mechanism system of a double chain type for a power-assisted bicycle according to an embodiment of the present invention, when seen from the rear side of the main sprocket.

FIG. 16 shows an example of the combined force mechanism system when the main sprocket 2 is seen from the rear side (from the opposite side of FIG. 1). The combined force mechanism system comprises a sub-sprocket 30 supported coaxially with the main sprocket 2, a power sprocket 33 rotatable by means of the assisting power generated under a given condition, an endless assisting chain 32 wound between the sub-sprocket 30 and the power sprocket 33 to transmit the assisting power from the power sprocket 33 to the sub-sprocket 30. The power sprocket 33 and the sub-sprocket 30 are each provided with teeth each having an equal pitch. Preferably, the number of the teeth of the power sprocket 33 is smaller than the number of the teeth of the sub-sprocket 30.

As the combined force mechanism system of FIG. 16 is provided inside the bicycle body from the main sprocket 2, neither the sub-sprocket 30 nor the power sprocket 33 protrude outwardly from the bicycle body, thereby assisting in making the bicycle body smaller in size. Further, as shown in FIG. 16, the distance between the main sprocket 2 and the power sprocket 33 can be made smaller than the radius of the main sprocket 2. Therefore, as shown in FIG. 18(a), the combined force mechanism system causes no risk of impairing the appearance of the bicycle because it is almost hidden inside axially the main sprocket 2, when the bicycle is seen from the outside (from the front side). Mounting a chain cover 35' on the main sprocket 2 so as to cover the chain 12 can further improve the appearance of the bicycle as well as protect the chain.

FIG. 18(b) illustrates a sectional side view of FIG. 18(a). As shown in the drawings, the main sprocket 2 and the sub-sprocket 32 are fixed with a pin 123 so as to prevent movement with respect to each other (that is, so as to cause them to rotate together), and they are connected to the drive shaft 4 through a one-way clutch 99. The power sprocket 33 is operatively coupled with the drive unit 33 through a power shaft 35a extending parallel to the drive shaft 4. A central bore 34' of the power sprocket 33 is formed with a serration (see FIG. 16), so that sliding rotation between the power shaft 35a and the central bore 34' can be prevented.

The drive unit 13 can be mounted on a frame for use with a general bicycle, and the housing includes the electric motor 37 to which electricity is supplied from a battery 17 (FIG. 2), and a reduction gear mechanism 35 connected to the output shaft 37a of the motor and transmitting to the power shaft 35a of the power sprocket 33 by reducing the rotational speed of the electric motor. Along the transmission passage of the assisting power in the reduction gear mechanism 35 is disposed a so-called one-way clutch, although not shown, which can transmit power in only one direction. The one-way clutch is arranged and connected so as to transmit the assisting power from the electric motor 37 to the power sprocket 33 yet not transmit torque in the reverse direction, that is, from the power sprocket 33 to the reduction gear mechanism 35.

Now, a description will be given regarding the action of the combined force mechanism system according to this embodiment of the present invention.

As the rotation of the electric motor 37 is controlled under given conditions and the assisting power is provided to the power sprocket 33 through the reduction gear mechanism 35, the torque of the power sprocket is transmitted through the assisting chain 12 to the sub-sprocket 30 and then immediately transmitted to the main sprocket 2 that is fixed to the sub-sprocket 30 and rotates by the pedaling force, whereby the assisting power and the pedaling force are combined together.

When the electric motor 37 is not rotating, the rotating load of the motor is not transmitted to the power sprocket 33 with the one-way clutch, although not shown, disposed in the reduction gear mechanism 35 so that a quietness and light feeling in driving the power-assisted bicycle can be achieved.

In this embodiment of the present invention, a so-called double chain system is adopted in such a manner that the assisting power is not transmitted directly to the chain 12 for use in transmitting the pedaling force as in the prior art technology and the assisting torque of the power sprocket 33 is transmitted to the sub-sprocket 30 rotating together with the main sprocket 2 through a chain 32 mounted thereon separately. By adopting the double chain system, the power-assisted bicycle according to this embodiment of the present invention offers greater freedom in locating the drive unit 13 compared with the prior art technology. For example, as shown in FIGS. 16 and 18(*a*), the drive unit 13 can be disposed in the direction of running the bicycle forward so that the drive unit 13 can be mounted on a frame for use with an ordinary bicycle, not on a frame prepared exclusively for use with a power-assisted bicycle.

Further, it can be noted herein as a matter of course that the power sprocket 33 can be disposed in an chosen position in the peripheral direction. FIG. 17 shows an example in which the position of the power sprocket 33 is changed by 90 degrees clockwise in the peripheral direction. In this case, the drive unit 13 can be mounted on a support frame for the saddle 18 (see FIG. 1). Moreover, the power sprocket 33 (the distance extending from the center of the main sprocket 2 to the center of the power sprocket 33) can further be located at any location radially from a periphery of the main sprocket 2 with great freedom of adjustment by selecting the length of the assisting chain 32.

As the double chain system can provide greater freedom of disposition of the parts in the manner as described above, this technology can easily permit the conversion of any bicycle into a power-assisted bicycle. In other words, this system imposes little limits on bicycle frame design.

Moreover, if the number of teeth of the power sprocket 33 is made smaller than the number of teeth of the sub-sprocket 30, as shown in the drawing, a reduction ration can be achieved only by the combined force mechanism system. This arrangement permits a small reduction ratio of the reduction gear mechanism 35 so that the reduction gear mechanism can be made simpler in structure and more compact in size compared to conventional power-assisted bicycles. In other words, this embodiment of the present invention can greatly extend the range of reduction ratios for the reduction gear mechanism.

Figure 8:
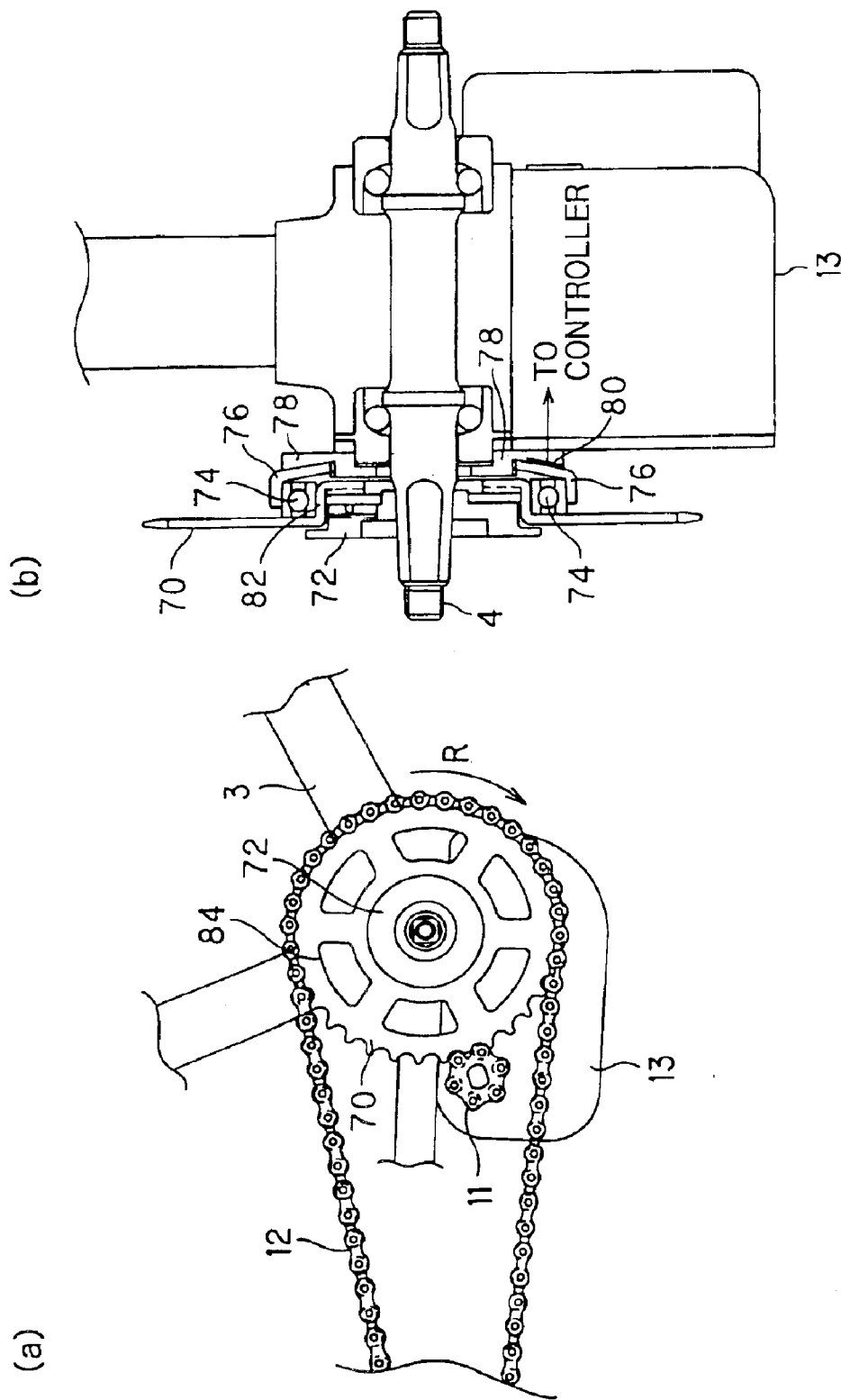
FIG. 8 is a view showing a torque detection apparatus according to a second embodiment of the present invention, in which (a) is a front view showing a sprocket for use with the torque detection apparatus of the second embodiment and (b) is a sectional side view showing the torque detection apparatus.

Second Embodiment:

FIGS. 8(*a*) and 8(*b*) illustrate each a torque detection mechanism system in accordance with a second embodiment of the present invention. In this embodiment, the elements other than the torque detection mechanism system are the same as those of the first embodiment, so that the identical and like structuring elements are provided with the identical reference numerals and symbols and a duplicate detailed description thereof will be omitted for brevity of explanation.

As shown in FIGS. 8(*a*) and 8(*b*), the torque detection mechanism system in the second embodiment is provided with a sprocket 70 having a cylindrical accommodation part 82 at the central portion thereof. The cylindrical accommodation part 82 is shaped in a cylindrical form that protrudes toward a one plate face side of the sprocket 70 and is depressed on the other plate face side thereof. The sprocket 70 may be disposed so as for the depression of the cylindrical accommodation part 82 to be directed to the pedal side, and the depression thereof accommodates a one-way clutch 72 that can transmit only the rotation in the one direction from the driving side portion to the driven side portion. The one-way clutch 72 has its driven side portion fixed to and coupled with the drive shaft 4 at its engagement portion with the depression of the cylindrical accommodation part 82 so as to transmit only the rotation in the direction R to the sprocket 70. The sprocket 70 is provided with a plurality of holes 84 (see FIG. 8(*a*)) about the cylindrical accommodation part 82 in order to make the sprocket lightweight.

As the one-way clutch 72, there may be selected a clutch of the type that can displace the driven side portion of the one-way clutch 72 toward the sprocket side along the axial direction by the amount of displacement corresponding to the magnitude of the pedaled torque when the drive shaft 4 is rotated in the direction R and the rotational force is transmitted to the sprocket 70. As an example, there may be used a one-way clutch of a ratchet gear type as used in the first embodiment of the present invention.

On the further inner face of the sprocket 70 on the opposite side, bearings 74 are disposed about the protruding portion of the cylindrical accommodation part 82 to hold the cylindrical accommodation part 82 from the side surrounding. The bearings 74 may preferably be disposed so as to compete with the load from both of the axial direction and the radial direction. Moreover, an elastic and metallic disc spring 76 in the form of a truncated cone may be preferably disposed to hold the bearings 74 so as to envelope the outer surroundings of the bearings 74, and the disc spring 76 may be fixed to the bicycle body through a rigid support member 78. In other words, the sprocket 70 is held elastically against the bicycle body so as to be rotatable on the side opposite to the one-way clutch 72. As will be apparent from FIG. 8(*b*), it is found that there is a region in the axial position, where an image of the axial width of the one-way clutch 72 overlaps with an image of the axial width of the disc spring 76, when the axial widths of the one-way clutch 72 and the disc spring 76 are projected against the central axial line of the drive shaft 4.

Moreover, the disc spring 76 is provided with a strain gauge 80 for detecting a deformation of the disc spring in accordance with the stress applied thereto, and the strain gauge 80 is connected to the controller 14 (see FIG. 2). The strain gauge 80 may be made, for example, from a resistance element made of a metallic thin layer. When such a thin-layer metallic resistance element is used for the strain gauge 80, an insulating layer of an oxide film may be disposed on the mirror-polished surface of the disc spring 76, and a resistance member composed of a plurality of elements is formed thereon in a bridge form by means of spattering or any other conventional techniques. The controller 14 can detect a variation in resistance of the bridge element due to the stress deformation applied to the disc spring 76 and then determines the magnitude of the stress thereof. In order to improve accuracy of detection, the strain gauge 80 may preferably be installed at a location at which the disc spring 76 is most likely to undergo the stress deformation, so as for the amount of stress deformation to cause a variation in resistance values to become as largest as possible.

As the substitution of the strain gauge 80, there may be used, for example, a piezoelectric resistance element for detecting a variation in resistance by the pressure applied to the disc spring 76 or a position sensor for detecting an amount of displacement of the surface of the disc spring 76.

Then, the action of the second embodiment of the present invention will be described more in detail.

As the rider presses the pedals 8R and 8L down to rotate the drive shaft 4 in the direction R, the rotational force is transmitted to the sprocket 70 through the driving side portion of the one-way clutch 72. At this time, the driven side portion of the one-way clutch 72 is prone to displace toward the sprocket side along the axial direction by the amount of displacement corresponding to the pedaled torque, so that the force of pressing inside acts on the sprocket 70 along the axial direction. This inside-pressing force is applied to the disc spring 76 holding the sprocket 70 through the bearings 74 and causes a stress deformation in the disc spring 76. This stress deformation reflects the amount of the axial displacement of the sprocket 70 by the one-way clutch 72, that is, the magnitude of the pedaled torque.

The resistance value of the strain gauge 80 varies with the stress deformation of the disc spring 76. The variation in the resistance values is detected with the controller 14 that in turn pre-saves, in its inner memory, the relationship of the resistance value of the strain gauge 80 with the pedaled torque in the form of a reference table and then determines the pedaled torque T by referencing the detected resistance value of the strain gauge 80 to the reference table. Then, as in a manner similar to in the first embodiment of the present invention as described above, the controller 14 controls the electric motor 37 so as to drive and rotate by means of the assisting torque Te computed on the basis of the pedaled torque T, and the assisting torque is transmitted directly to the sprocket 70 through the sprocket drive gear 11.

As described above, in the second embodiment of the present invention, too, the torque can be computed on the basis of the stress deformation of the disc spring 76 caused to occur by the pressing force of the one-way clutch 72 that is also requisite for a general bicycle, without separately adding the highly rigid, voluminous and heavy elastic member and transmission mechanism system, etc., to a conventional power-assisted bicycle. Therefore, the second embodiment of the present invention can greatly reduce a space and weight of the torque detection mechanism system and simplify the mechanism thereof.

Further, the second embodiment can further shorten a stroke in the axial direction because the one-way clutch 72 and the disc spring 76 are disposed in the same width in such a manner that the former is accommodated in the cylindrical accommodation part 82 of the sprocket 70 and the latter is held indirectly from the outer periphery of the cylindrical accommodation part 82 thereof. This advantage can be further improved by adopting the way of detecting an amount corresponding to the pedaled torque by the strain gauge 80 formed in a thin form on the surface of the disc spring 76. This can provide the second embodiment of the present invention with the more remarkable effects than that of the first embodiment in terms of saving a space.

Third Embodiment:

The torque detection apparatus (the ratchet gear) and the torque detection apparatus according to the third embodiment of the present invention will be described in more detail with reference to FIGS. 9 to 14. As the elements other than the torque detection apparatus are identical to those of the first and second embodiments, the same elements of the third embodiment as those of the first and second embodiments are provided with the same reference numerals and a detailed description of those same or like elements will be omitted from the following description.

Figure 9:
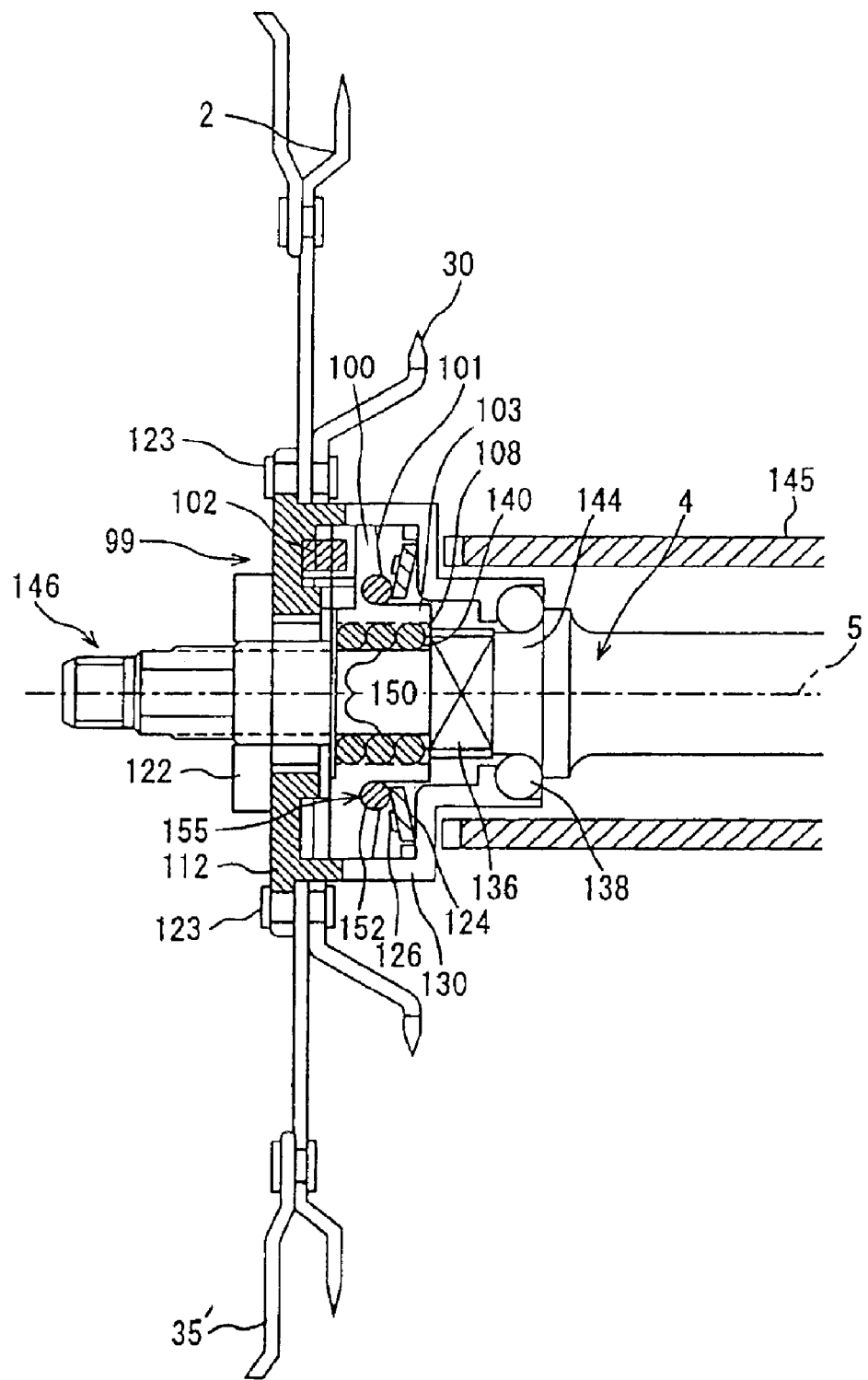
FIG. 9 is a sectional side view showing a torque detection apparatus for use with a power-assisted bicycle to which a one-way clutch (a ratchet gear) according to a third embodiment of the present invention is applied.
Figure 10:
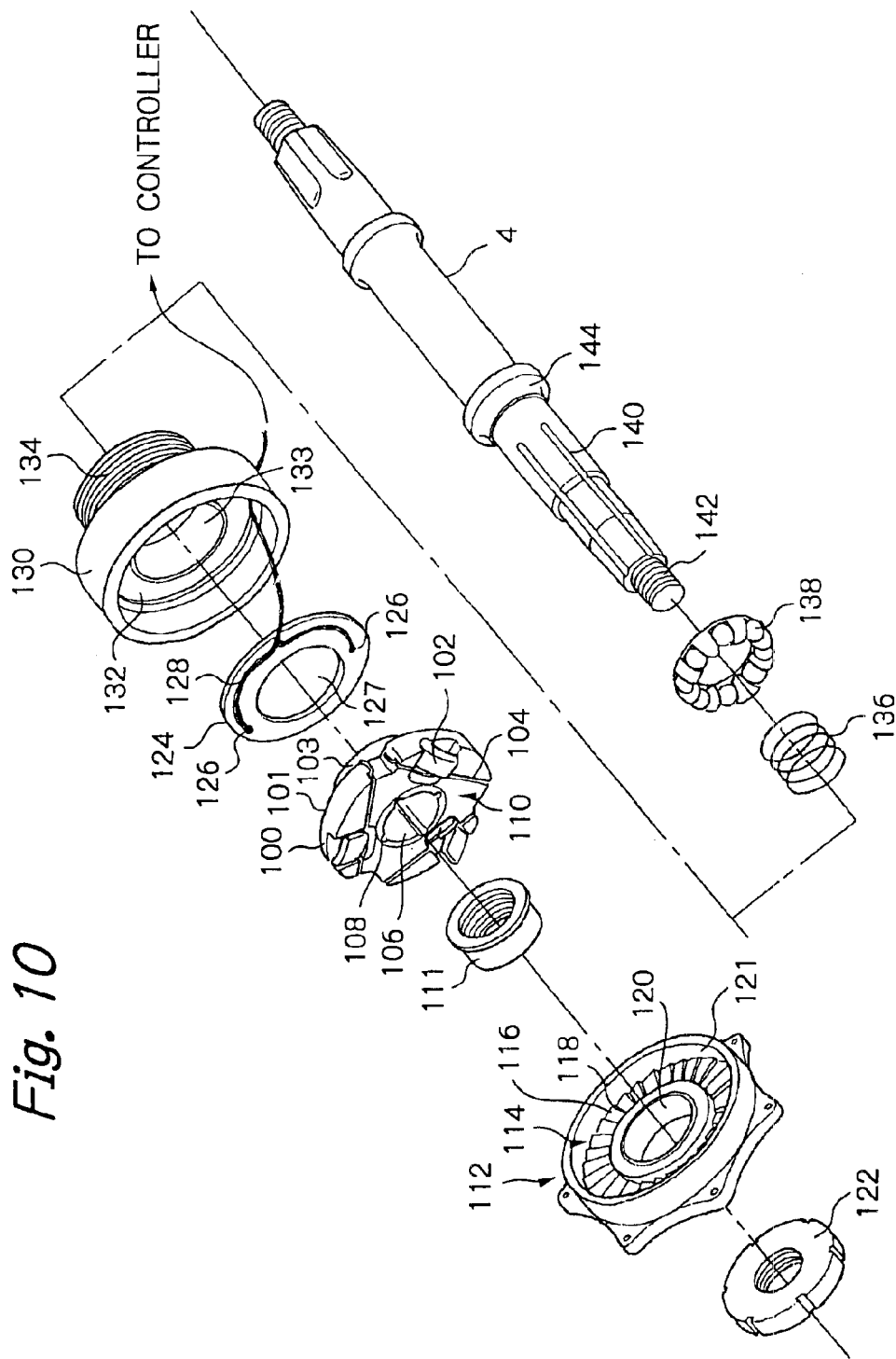
FIG. 10 is an exploded perspective view showing the one-way clutch (the ratchet gear) and the torque detection apparatus, as shown in FIG. 9.

As shown in FIG. 9, the sprocket 2 is axially supported on the drive shaft 4 by the aid of the ratchet gear that is composed of a piece part 100 and a tooth part 112, as major structuring elements, disposed opposite thereto, as shown in FIG. 10.

Figure 13:
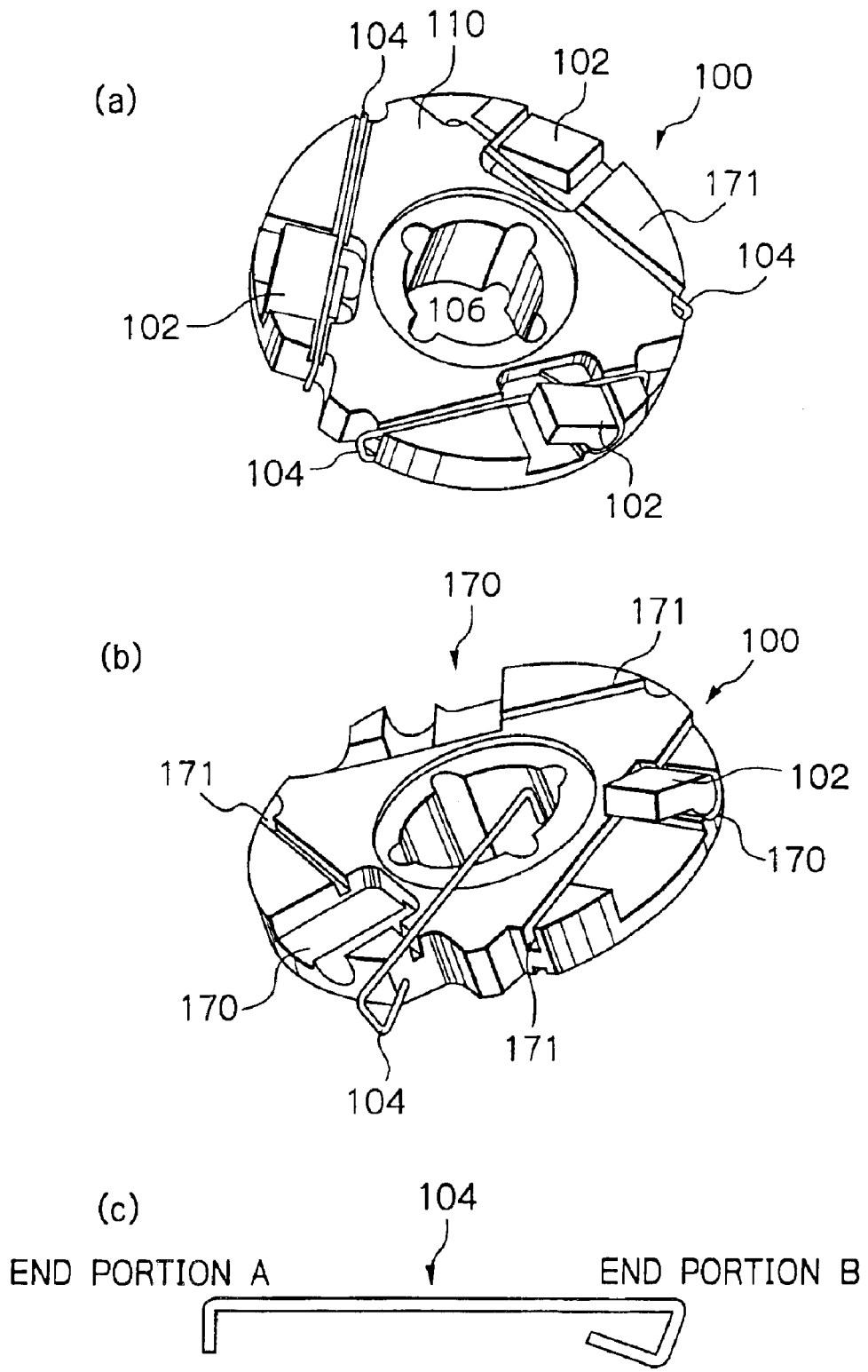
FIG. 13 is a view showing the structures of the piece part of the one-way clutch and a spring bar for use with the piece part thereof, in which (a) is a perspective view showing the state in which the spring bar is mounted; (b) is a perspective view showing the state in which no spring bar is mounted; and (c) is a side view showing the spring bar.

As shown in FIG. 13(*a*), the piece part 100 is provided at its central portion with a bore 106 in a generally disc-shaped form that can receive the drive shaft 4 and have three rigid ratchet pieces 102 disposed at an equal angle along the peripheral direction of the bore 106 at the side of a second engagement face 110 opposite to the tooth part 112. Further, the piece part 100 is provided with three depressions 170 along the peripheral direction thereof, as shown in FIG. 13(*b*), in order to accommodate each of the ratchet pieces 102. As shown in FIG. 14(*a*), the ratchet piece 102 may be comprised of a rotary shaft portion 102*a* arranged to be accommodated in the depression 170 so as to be rotatable about the rotary shaft R, an engagement portion 102*b* extending from a side face of the rotary shaft portion 102*a*, a flat portion 102*c* formed adjacent to the engagement portion 102*b* on the side face of the rotary shaft portion 102*a* from which no engagement portion 102*b* extends. The ratchet piece 102 is allowed to pivot in a state in which the rotary shaft portion 102*a* is located in the depression 170, and the engagement portion 102*b* changes an angle with respect to the second engagement face 110 in accordance with this pivotal movement of the ratchet piece 102. In another mode of this embodiment, the depression 170 may be disposed in such a manner that a depressed part is elongated so as to accommodate the engagement portion when the engagement portion 102*b* falls down (FIG. 14(*b*)).

Referring again to FIG. 13(*b*), the piece part 100 is provided with a straight groove 171 adjacent to each of the depressions 170 to enable accommodating a spring bar 104. Both ends of each of the three straight grooves 171 extend up to the outer peripheral edges of the piece part 100. As shown in FIG. 13(*c*), the spring bar 104 is structured in such a manner that the one end portion A is bent at a generally right angle and the other end portion B is bent in a generally angularly C-shaped form. When the spring bar 104 is to be mounted in the straight groove 171 of the piece part 100, the spring bar 104 can be readily installed on the piece part 100, as shown in FIG. 15, simply by clamping the piece part 100, as if with a clip, with the angularly C-shaped end portion B of the spring bar 104 while sliding the spring bar 104 along and in the straight groove 171. There is the possibility, however, that the spring bar 104 will slip and fall down from the piece part 100 because of the pulling force from the end portion B of the spring bar 104, if the piece part 100 is clamped with the spring bar 104 on its own in the manner as described above. In order to ensure the stable attachment of the spring bar 104 to the piece part 100, the end portion A of the spring bar 104 bent at a right angle is engaged with the side wall of the piece part 100. Therefore, the spring bar 104 having the structure as described above permits mounting it on the piece part 100 with ease and prevents the detachment of it therefrom.

Figure 11:
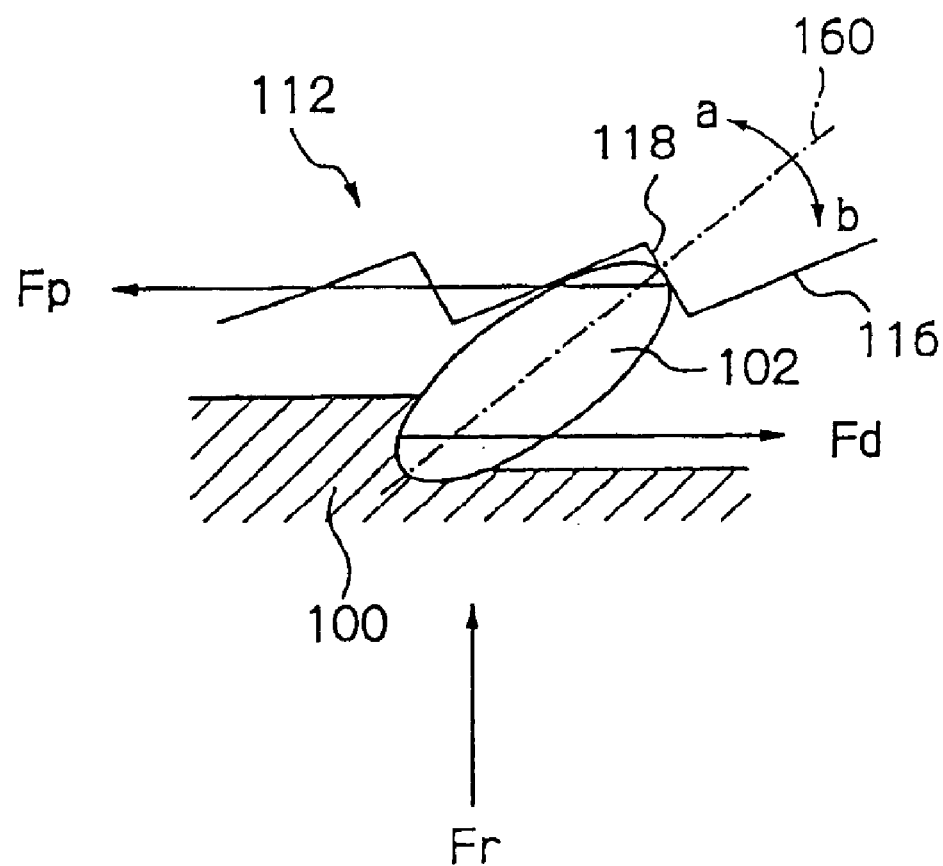
FIG. 11 is a view showing a state of engagement of a tooth with a piece part of the one-way clutch (the ratchet gear) in order to describe the principle of the torque detection apparatus according to the third embodiment.

In the case where the spring bar 104 is mounted in the straight groove 171 of the piece part 100, the straight portion of the spring bar 104 is engaged with the flat portion 102c of the ratchet piece 102, as shown in FIG. 14(b), and presses onto the flat portion 102c, so that the flat portion 102c mates with the straight portion of the spring bar 104. Therefore, the ratchet piece 102 is caused to rise in its lengthwise direction (the balance direction 160 of FIG. 11 at a given angle with respect to the second engagement face 110, when no external force acts. As shown in FIG. 11, when the ratchet piece 102 is deviated in the ascending direction a or in the descending direction b from the balance direction 160, the spring bar 104 imposes a slight magnitude of elasticity onto the ratchet piece 102 so as to return the deviation to its original balance direction 160.

Referring again to FIGS. 9 and 10, the cylindrical portion 103 extends from the rear face 101 of the piece part 100. The cylindrical portion 103 is provided with a bore 106 passing throughout a central part thereof. The rear face 101 of the piece part 100 is provided with a circular groove 155 (FIG. 9) on the outer periphery of the cylindrical portion 103, and a number of steel balls 152 are inserted in the circular groove 155. Therefore, the rear face 101 provides an axially loading bearing and an axially sliding bearing.

A disc spring 124 is brought into abutment with the rear face 110 of the piece part 100 by inserting the cylindrical portion 103 into a central bore 127. In this case, the disc spring 124 is in slidable abutment with the rear face 101 through the steel balls 152, that is, the loading bearing, in the direction elastically resisting the pressure from the piece part 100. On the front surface of the disc spring 124 may be disposed a strain gauge 126 at two opposite locations angled at 180 degree. The strain gauge 126 is electrically connected to the controller 14 via a lead wire 128. More preferably, the strain gauges may be disposed on the disc spring 124 at three locations or more. At this time, it is preferred that a plurality of the strain gauges is disposed on the front surface of the disc spring 124 in the positions rotation-symmetrical to each other.

The disc spring 124 is accommodated in an inner bottom portion 132 of a supporting member 130 in a bowl form. The supporting member 130 is provided with a through support bore 133 passing through its central portion for receiving the drive shaft 4 and with a supporting cylindrical portion 134 protruding from its rear face. The supporting cylindrical portion 134 is threaded on the outer peripheral surface thereof and screwed with the threaded inner wall of a supporting portion 145 to fix the supporting member 130 to the bicycle body. With the inner wall of the supporting cylindrical portion 134 is engaged a bearing 138 corresponding to the loads in both of the axial and radial directions (as shown in FIG. 9). The bearing 138 is engaged with a sloping stopper face 144 formed on the drive shaft 4. As a bearing 139 (FIG. 8(b)) is mounted on the side opposite to the drive shaft 4 in a like manner, the drive shaft can be rotated with respect to the bicycle body.

The inner wall of the bore 106 of the piece portion is provided with first rotation-preventive grooves 108 at four locations, each extending in the axial direction 5. The outer wall portion of the drive shaft 4 sliding and coming into abutment with the inner wall of the bore 106 is provided with second rotation-preventive grooves 140 at four locations, each extending in the axial direction 5 opposite to the first rotation-preventive grooves 108. As shown in FIG. 12(a), the first rotation-preventive grooves 108 and the second rotation-preventive grooves 140 opposite to the first grooves 108 constitute each a columnar groove extending in the axial direction. In each of the columnar grooves, there are accommodated and filled a number of steel balls 150. This arrangement permits the piece part 100 to be transferred in the axial direction 5 at the minimal resistance to friction and prevents a rotation relative to the drive shaft 4. This system can be said to be a sort of a ball spline. It is also noted that a ball spline of a different type such as a ball spline of an endless pivotal type can be used as a slidable rotation-preventive system.

Further, a system other than such a ball spline can also be used. For example, as shown in FIG. 12(b), a so-called key spline type can also be applied as a rotation-preventive system, which is arranged in such a manner that the drive shaft 4 is provided with a protruding portion 140a extending in the axial direction and the piece part 100 is provided with a third rotation-preventive groove 108a disposed to accommodate the protruding portion 140a. In FIG. 12(b), the protruding portion 140a may be disposed at the side of the piece part 100 and the third rotation-preventive groove 108a may be disposed at the side of the drive shaft 4. Moreover, as shown in FIG. 12(c), a so-called key-groove type can also be applied as a rotation-preventive system, which is arranged in such a manner that the piece part 100 is provided with a fourth rotation-preventive groove 108b extending in the axial direction and the drive shaft 4 is provided with a fifth rotation-preventive groove 140b facing the fourth rotation-preventive groove 108b. These grooves constitute a groove in the form of a quadratic prism in which a key plate is accommodated. A baffle portion 52 as used in the first embodiment may also be used in the third embodiment.

Referring again to FIGS. 9 and 10, the tooth part 112 is formed with a bore 120 at the central portion thereof, which receives the drive shaft 4, and comprises a generally cylindrical member with a mounting flange disposed at the peripheral portion thereof. The inner bottom portion of the generally cylindrical member corresponds to a first engagement face 121 of the tooth part 112. The first engagement face 121 is provided with a plurality of ratchet teeth 114 engageable with the ratchet pieces 102. Each of the ratchet teeth 114 is composed of a sharply sloping face 118 and a gently sloping face 116 with respect to the first engagement face 121, which are formed alternately and periodically along the peripheral direction of the tooth part.

The tooth part 112 is axially supported on the drive shaft 4 through a collar 111 so as to allow the first engagement face 121 to face the second engagement face 110 of the piece part 100. At this time, the ratchet pieces 102 are engaged with the ratchet gears 112 (see FIG. 11). In other words, the drive shaft 4 is operatively coupled with the tooth part 112 through only a connection portion between the ratchet piece 102 and the ratchet tooth 112. As shown in FIG. 9, a washer 122 is engaged with the end portion 142 of the drive shaft 4 passed through the bore 120 through the collar 111 to keep the tooth part 112 from deviating outwardly in the axial direction. The main sprocket 2 is mounted on the tooth part 112 through a pin 123 (FIG. 9) in a non-movable manner. Further, a pedal shaft 146 is mounted on the top of the drive shaft 4. This arrangement completes a ratchet gear connecting the drive shaft 4 to the main sprocket 2 so as to enable only the rotation produced by the pedaling force in the direction of running the bicycle forward to be transmitted to the main sprocket 2.

Preferably, an offset spring 136 may be interposed between the sloping stopper face 144 of the drive shaft 4 and the rear face 101 of the piece part 100. The offset spring 136 is deviated in the axial direction so as to create a clearance between the steel balls 152 installed in the rear face 101 and the disc spring 124 when the pedaled force is lower than a predetermined value, e.g., when it is close to substantially zero.

Then, the actions of the third embodiment of the present invention will be described hereinafter.

As the driver pressed the pedals 8R and 8L down to give a pedaled force and rotate the drive shaft 4 in the direction of running the bicycle forward, the resulting rotation force is transmitted to the piece part 100 held axially on the drive shaft 4 in a non-rotatable manner. At this time, as shown in FIG. 11, a force Fd corresponding to the pedaled force is given the ratchet piece 102 from the piece part 100, so that the top end portion thereof is allowed to come into abutment with the sharply sloping face 118 of the ratchet tooth 114 of the tooth part 112 in order to transmit the resulting force to the ratchet tooth. As the ratchet tooth part 112 is connected to the sprocket 2, the top end portion of the ratchet piece 102 receives a force Fp from the sharply sloping face 118 by the load for driving. If the ratchet piece 102 receives the forces Fp and Fd in the opposite directions from both of the end portions thereof, it is caused to arise in the direction a. As the ratchet piece 102 arises in the direction a, the piece part 100 is transferred inwardly in the axial direction and presses down the disc spring 124 interposed between the piece part 100 and the supporting member 130. On the other hand, an elastic force Fr acts on the disc spring 124 in resistance to the force of pressing down the disc spring 124. The elastic force Fr can be balanced within a short time with the force reflecting the pedaled force transferring the piece part 100 in the axial direction. Therefore, the stress deformation of the disc spring 124, a clearance between the piece part 100 and the tooth part 112, an angle of the ratchet piece 102 with respect to the second engagement face 110, a position of the piece part 100 with respect to the bicycle body frame, a pressure for pressing the disc spring 124 down, etc. can work as a physical amount reflecting the pedaling force. A pedaled torque can accordingly be assumed by detecting at least one of the above physical amounts.

In this third embodiment, the stress deformation of the disc spring 124 is to be detected as an example of the physical amounts. The controller 14 is subjected to addition operation (including average operation) of signals from at least two strain gauges 126 disposed on the disc spring 124. By averaging the amounts of stress deformation at plural locations in the manner as described above, a larger variation in output can be set even for the equal pedaled torque and noise components can be equalized, so that a S/N ratio can be improved to further increase accuracy of assuming a torque. This effect can become larger as the number of strain gauges is increased.

Further, if the pedaling force is lower than the predetermined value or in other cases, the offset spring 136 gives a clearance between the rear face 101 of the piece part 100 and the disc spring 124, so that a frequency of impacts of the steel balls 152 on the disc spring 124 can be lessened. This can reduce a noise component of signals from the strain gauges to improve the detection of torque and stability of the power-assisting control.

It is to be noted that the power-assisting control in the third embodiment of the present invention is substantially the same as that in the first and second embodiments.

The third embodiment can offer the remarkable advantages and merits as will be summarized below.

(1) The ratchet gear and the torque detection apparatus can be realized by one mechanism system, so that a number of parts can be reduced. As a consequence, the bicycle can be made more compact in size and lighter in weight as well as prepared at cheaper costs than conventional ones.

(2) As the disc spring with a load unit and a load detection sensor integrated therein is used at the portion at which the pedaling torque is to be detected, the two functions can be realized by one unit, so that this can achieve a further compact and lightweight structure and cheaper costs of manufacturing, in addition to the effects as described above.

(3) As the present invention can achieve a compact, lightweight and simple structure of the torque detection apparatus at a very high level as have been described in the items (1) and (2) above, the possibility of mounting the torque detection apparatus on a usual bicycle can also be extended.

(4) The loss of transmitting a load can be reduced as compared with a conventional mechanism system for the reasons as described in the items (1) and (2) above, so that a feeling of assisting can be realized at a high responsiveness to control.

(5) As a useless movement of the pedals can be lessened (up to the time when the sensor senses) for the reasons as described in the items (1) and (2) above, as compared with a conventional mechanism system (using a coiled spring), a feeling upon pedaling the power-assisted bicycle according to the present invention can be as if pedaling a usual bicycle, although there is a feeling of resisting upon pedaling for the conventional mechanism system.

Although the present invention has been described by way of each of the embodiments, it is to be understood that the present invention is interpreted as being not limited in any respect to those embodiments and encompassing any modifications and variations without departing from the scope and spirit of the invention.

For instance, in each of the embodiments of the present invention, it is to be understood that the way of mounting either one of the piece and the tooth of the ratchet gear on the sprocket and the other one of them on the drive shaft can be modified in any optional and appropriate manner. For example, in the case of the third embodiment, the piece part 100 may be mounted at the sprocket side and the tooth part 112 may be mounted on the drive shaft 4 so as to be slidable yet non-rotatable, thereby permitting the tooth part 112 to press the disc spring 124 down.

Although three ratchet pieces are taken as an example in the first and third embodiments, the number of the ratchet pieces may be two or four or more without doubt. It is also to be noted that the numbers of the grooves and the protruding portions as the rotation-preventive system, as shown in FIGS. 12(a), (b) and (c), are not limited to those as described above.

It is further to be noted that, although the structuring elements can also be applied to the other embodiments without departing from the scope and spirit of the invention, even if they have been described in one or more embodiments yet not in the other embodiments. For example, the rotation-preventive system as shown in FIGS. 12(a), (b) and (c) can also be applied in common to the first and second embodiments. Further, the one-way clutch system as described by way of the second embodiment can also be applied to the ratchet gear in the first and third embodiments. Moreover, a plurality of the strain gauges in the second embodiment can also be disposed in the same manner as in the third embodiment, and the output signals can be subjected to average operation.

The elastic member disposed in resistance to the deformation of the ratchet gear can also be modified and varied in an optional and appropriate manner in terms of its kind and shape. An elastic member made of a rubbery material can also be used, in addition to the disc spring and the coil spring.

In each embodiment of the present invention, the physical amount to be detected may be optionally and appropriately selected as long as it is based on the deformation of the ratchet gear as illustrated in the third embodiment. For example, a piezoelectric sensor for detecting a variation in forcing-out pressure on the basis of the axial displacement of the ratchet tooth part may also be used in the first embodiment. Moreover, it is possible to mount a strain gauge on the ratchet piece and compute the pedaling torque on the basis of an amount of stress deformation of the ratchet piece. Furthermore, a piezoelectric sensor may be disposed at an inner bottom portion of the supporting member in the third embodiment. An angle of rotation of the ratchet piece may also be detected with an encoder disposed on the rotary shaft thereof. In addition, there may be disposed a position sensor for detecting the position of the piece part relative to the tooth part.

Moreover, although the strain gauge is taken as an example of the means of detecting the stress deformation, the means is not limited to the strain gauge as long as the physical amount in association with the stress deformation can be detected.

Furthermore, the one-way clutch and the torque detection apparatus according to the present invention are described as an example that can be applied to a power-assisted bicycle. It is to be noted, however, that the present invention can be applied to any other chosen usage as long as the one-way clutch according to the present invention can be applied to transmitting only the one-way rotation from the driving means to the driven means.

(Effects of the Invention)

As described in more detail above, the one-way clutch according to the present invention can offer the advantage that it can also be used as a torque detection apparatus for detecting the torque produced by the rotation in the one-way direction by adding a detection system for detecting the axial stress because the one-way clutch can convert at least a portion of the stress generated inside the clutch by the rotation in the one-way direction into a stress in the axial direction so as to allow the stress in the axial direction to resist the elasticity. Further, the present invention can offer the advantage that the elasticity can act as a buffer to the stress generated inside the clutch by the one-way stress because the stress in the axial direction can compete with the elasticity.

Moreover, as the torque detection apparatus according to the present invention can also be used as the one-way clutch because the axial stress of the one-way clutch can be detected as the torque, the present invention can present the advantage that an apparatus which requires the use of the one-way clutch and the detection of torque can be made compact in size and light in weight.

What is claimed is:

1. A one-way clutch for transmitting only one-way rotation about an axial direction thereof; said one-way clutch comprising:
   a first member having a first engagement face formed with a plurality of teeth, and
   a second member having a second engagement face formed with a plurality of pieces, said first and second members being disposed in a series along said axial direction; wherein
   each of said teeth comprises a sharply sloping face and a gently sloping face with respect to said first engagement face;
   each of said pieces is mounted on said second member so that the angle in the lengthwise direction thereof with respect to said second engagement face is variable;
   each of said pieces is engaged with the sharply sloping faces of the teeth to prevent relative rotation between said first and second members and the angle of each of said pieces with respect to said second engagement face increases causing the first and second members to move away from each other, resisting elasticity, when either one of said first member or said second member is rotated in said one-way rotation; and
   each of said pieces comes into abutment with the gently sloping face of said tooth to enable the relative rotation between said first and second members and the angle of each of said pieces with respect to said second engagement face decreases causing the first and second members to move closer to each other by the elasticity, when either one of said first member or said second member is rotated in a direction opposite to said one-way rotation.

2. The one-way clutch as claimed in claim 1, wherein each of said pieces is made from a rigid member and disposed so as for the lengthwise direction thereof to elastically pivot about a direction at a given angle with respect to said second engagement face.

3. The one-way clutch as claimed in claim 2, wherein each of said pieces comprises a rotary shaft portion and an engagement portion, said rotary shaft portion being pivotally disposed within a depression provided on said second member and said engagement portion extending from said rotary shaft portion to engage with said teeth.

4. The one-way clutch as claimed in claim 3, wherein each of said pieces has a flat portion on a side face of said rotary shaft portion and each of said pieces is permitted to pivot elastically by allowing an elastic member to abut with the flat portion of said piece.

5. The one-way clutch as claimed in claim 4, wherein said elastic member is in the form of a bar and can be accommodated in a groove formed in said second member in a position adjacent to said depression of each of said pieces.

6. The one-way clutch as claimed in claim 5, wherein said elastic member comprises a first end portion bent at a generally right angle and a second end portion bent in an angularly C-shaped form.

7. The one-way clutch as claimed in claim 1, wherein either one of said first member and said second member is disposed so as to be slidable along said axial direction and to be capable of being mounted on a drive system through a rotation-preventive system for preventing a rotation relative to the drive system; and the other of said first member and said second member is capable of being connected to a driven system.

8. The one-way clutch as claimed in claim 7, wherein either one of said first member or said second member, mounted slidably in said axial direction through said rotation-preventive system, is supported so that an elastic unit abuts with a rear face thereof opposite to the engagement face thereof and the elasticity is provided by the elastic unit.

9. The one-way clutch as claimed in claim 8, wherein said elastic unit is in a generally flat form having a length in the axial direction thereof shorter than a length in the radial direction thereof.

10. The one-way clutch as claimed in claim 9, wherein said elastic unit comprises a disc spring.

11. The one-way clutch as claimed in claim 9, wherein the rear face of either one of said first member or said second member abuttable with said elastic unit is provided with a bearing for loading and rotating-sliding.

12. The one-way clutch as claimed in claim 11, wherein said bearing comprises a plurality of steel balls forced rotatably in a circular groove formed in the rear face thereof.

13. The one-way clutch as claimed in claim 9, wherein, when a torque generated by said one-way rotation is lower than a given value, an offset elastic member is interposed between the rear face thereof and said elastic unit to deviate either one of said first member or said second member so as to create a clearance between the rear face thereof and said elastic unit.

14. The one-way clutch as claimed in claim 7, wherein said rotation-preventive system comprises a ball spline.

15. The one-way clutch as claimed in claim 14, wherein either one of said first member or said second member mounted slidably in said axial direction is provided with a bore for accommodating a rotary shaft to produce a torque by said one-way rotation.

16. The one-way clutch as claimed in claim 15, wherein said rotation-preventive system comprises one or plural rows of first grooves formed in an inner wall of the bore and extending in said axial direction, one or plural rows of second grooves formed in the rotary shaft so as to face said first grooves and extending in said axial direction, and steel balls to be accommodated in the first grooves and the second grooves.

17. The one-way clutch as claimed in claim 15, wherein said rotation-preventive system comprises one or plural rows of first grooves formed in an inner wall of the bore and extending in said axial direction, one or plural rows of second grooves formed in said rotary shaft so as to face the first grooves and extending in said axial direction, and plates to be accommodated in the first grooves and the second grooves.

18. The one-way clutch as claimed in claim 15, wherein said rotation-preventive system comprises one or plural rows of grooves formed in an inner wall of the bore and extending in said axial direction, and one or plural rows of protruding portions formed in said rotary shaft so as to be accommodated in the grooves.

19. The one-way clutch as claimed in claim 15, wherein said rotation-preventive system comprises one or plural rows of protruding portions formed in an inner wall of the bore and extending in said axial direction and one or plural rows of grooves formed in said rotary shaft so as to accommodate the grooves.

20. The one-way clutch as claimed in claim 15, wherein said rotation-preventive system comprises a plate member extending over the entire length of the diameter of the bore and connecting an inner wall of the bore and a through groove extending in the shaft along said axial direction.

21. A torque detection apparatus comprising a one-way clutch for transmitting only a one-way rotation about an axial direction and capable of detecting a torque by said one-way rotation, wherein:
said one-way clutch converts at least a portion of a stress generated inside said clutch by said one-way rotation into a stress in said axial direction to resist elasticity; and
a detection system for detecting the stress in said axial direction as a torque is further provided.

22. The torque detection apparatus as claimed in claim 21, wherein:
said one-way clutch comprises a first member and a second member disposed in a series along said axial direction;
when either one of said first member or said second member implements said one-way direction, said first member and said second member are engaged with each other to halt the relative rotation between said first member and said second member and said first member and said second member are caused to separate from each other in said axial direction in resistance to the elasticity; and
when either one of said first member or said second member rotates in a direction opposite to said one-way direction, said first member and said second member are disengaged from each other to enable the relative rotation between said first member and said second member and said first member and said second member are caused to move closer to each other in said axial direction with the aid of the elasticity.

23. The torque detection apparatus as claimed in claim 22, wherein:
said first member has a first engagement face formed with a plurality of teeth and said second member has a second engagement face formed with a plurality of pieces;
said first engagement face and said second engagement face are disposed facing each other generally perpendicularly to said axial direction;
each of said pieces is engaged between the adjacent teeth to perform the engagement with said teeth when either one of said first member or said second member is rotated in said one-way direction of rotation; and
each of said pieces is disengaged from said teeth to release the engagement of said pieces with said teeth when either one of said first member or said second member is rotated in a direction opposite to said one-way direction of rotation.

24. The torque detection apparatus as claimed in claim 23, wherein:
each of said teeth comprises a sharply sloping face and a gently sloping face with respect to said first engagement face;
each of said pieces is mounted on said second member so that the angle in the lengthwise direction thereof with respect to said second engagement face is variable;
each of said pieces is engaged with the sharply sloping faces of the teeth to perform the engagement with said teeth and the angle of each of said pieces with respect to said second engagement face increases, when either one of said first member or said second member is rotated in said one-way direction of rotation; and
each of said pieces comes into abutment with the gently sloping face of said tooth and the angle of each of said pieces with respect to said second engagement face decreases, when either one of said first member or said second member is rotated in the direction opposite to said one-way direction of rotation.

25. The torque detection apparatus as claimed in claim 24, wherein each of said pieces is made from a rigid member and disposed so that the lengthwise direction thereof elastically pivots about a given angle with respect to said second engagement face.

26. The torque detection apparatus as claimed in claim 25, wherein each of said pieces comprises a rotary shaft portion and an engagement portion, said rotary shaft portion being pivotally disposed within a depression provided on said second member and said engagement portion extending from said rotary shaft portion to engage with said teeth.

27. The torque detection apparatus as claimed in claim 26, wherein each of said pieces has a flat portion on a side face of said rotary shaft portion and each of said pieces is permitted to pivot elastically by allowing an elastic member to abut with the flat portion of each of said pieces.

28. The torque detection apparatus as claimed in claim 27, wherein said elastic member is in the form of a bar and can be accommodated in a groove formed in said second member in a position adjacent to said depression of each of said pieces.

29. The torque detection apparatus as claimed in claim 28, wherein said elastic member comprises a first end portion bent at a generally right angle and a second end portion bent in an angularly C-shaped form.

30. The torque detection apparatus as claimed in any one of claim 22, wherein either one of said first member or said second member is disposed so as to be slidable along said axial direction and to be mountable on a drive system through a rotation-preventive system for preventing a rotation relative to the drive system; and the other of said first member and said second member is connectable to a driven system.

31. The torque detection apparatus as claimed in claim 30, wherein either one of said first member or said second member mounted slidably in said axial direction through said rotation-preventive system is supported so that an elastic unit abuts with a rear face thereof opposite to the engagement face thereof and the elasticity is provided by the elastic unit.

32. The torque detection apparatus as claimed in claim 31, wherein said elastic unit is in a generally flat form having a length in an axial direction thereof shorter than a length in a radial direction thereof.

33. The torque detection apparatus as claimed in claim 32, wherein said elastic unit comprises a disc spring.

34. The torque detection apparatus as claimed in claim 33, wherein said detection system detects a stress deformation of said elastic unit.

35. The torque detection apparatus as claimed in claim 34, wherein said detection system is provided with a plurality of deformation sensors mounted at plural locations of said elastic unit and detects the torque on the basis of an average value of the output signals of said plurality of deformation sensors.

* * * * *

UNITED STATES PATENT AND TRADEMARK OFFICE
CERTIFICATE OF CORRECTION

PATENT NO. : 6,889,809 B2
DATED : May 10, 2005
INVENTOR(S) : Akihito Yoshiie et al.

It is certified that error appears in the above-identified patent and that said Letters Patent is hereby corrected as shown below:

<u>Title page,</u>
Item [73], Assignee, insert -- Sunstar Giken Kabushiki Kaisha, Osaka, (JP) -- after "Sunstar Suisse SA, Ecublens (CH)".

Signed and Sealed this

Seventeenth Day of January, 2006

JON W. DUDAS
*Director of the United States Patent and Trademark Office*